US012638207B2

(12) United States Patent
Bondalapati et al.

(10) Patent No.: US 12,638,207 B2
(45) Date of Patent: *May 26, 2026

(54) OCCUPANCY TRACKING USING USER DEVICE DETECTION

(71) Applicant: Lennox Industries Inc., Richardson, TX (US)

(72) Inventors: Sunil Bondalapati, Frisco, TX (US); Prasad Mecheri Chandravihar, Richardson, TX (US); Bhavana Chadive, Richardson, TX (US); Fnu Kriti, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 316 days.

This patent is subject to a terminal disclaimer.

(21) Appl. No.: 18/464,504

(22) Filed: Sep. 11, 2023

(65) Prior Publication Data

US 2023/0417444 A1 Dec. 28, 2023

Related U.S. Application Data

(63) Continuation of application No. 18/052,432, filed on Nov. 3, 2022, now Pat. No. 11,802,712, which is a continuation of application No. 17/139,201, filed on Dec. 31, 2020, now Pat. No. 11,536,482.

(51) Int. Cl.
| | |
|---|---|
| *F24F 11/65* | (2018.01) |
| *F24F 11/46* | (2018.01) |
| *F24F 120/10* | (2018.01) |
| *H04W 4/021* | (2018.01) |
| *H04W 4/029* | (2018.01) |

(Continued)

(52) U.S. Cl.
CPC .............. *F24F 11/65* (2018.01); *F24F 11/46* (2018.01); *H04W 4/021* (2013.01); *H04W 4/029* (2018.02); *H04W 64/006* (2013.01); *F24F 2120/10* (2018.01); *H04W 80/12* (2013.01)

(58) Field of Classification Search
None
See application file for complete search history.

(56) References Cited

U.S. PATENT DOCUMENTS

| | | | | |
|---|---|---|---|---|
| 9,408,041 B1 * | 8/2016 | Abehassera | ............ | G08B 21/22 |
| 2014/0031989 A1 * | 1/2014 | Bergman | ................. | F24F 11/66 |
| | | | | 700/276 |
| 2017/0017214 A1 * | 1/2017 | O'Keeffe | ............... | G05B 15/02 |

(Continued)

OTHER PUBLICATIONS

K. Akkaya, I. Guvenc, R. Aygun, N. Pala and A. Kadri, "IoT-based occupancy monitoring techniques for energy-efficient smart buildings," 2015 IEEE Wireless Communications and Networking Conference Workshops (WCNCW), 2015, pp. 58-63, doi: 10.1109/WCNCW.2015.7122529. (Year: 2015).*

(Continued)

*Primary Examiner* — Kamini S Shah
*Assistant Examiner* — Istiaque Ahmed

(57) ABSTRACT

An occupancy tracking device configured to identify devices connected to an access point over a predetermined time period. The device is further configured to populate entries in a device log for the identified devices. The device is further configured to determine a predicted occupancy level and to control a Heating, Ventilation, and Air Conditioning (HVAC) system based on the predicted occupancy level.

17 Claims, 10 Drawing Sheets

(51) Int. Cl.
    *H04W 64/00*      (2009.01)
    *H04W 80/12*      (2009.01)

(56)            References Cited

U.S. PATENT DOCUMENTS

| | | | |
|---|---|---|---|
| 2018/0004178 A1* | 1/2018 | Haines | G05B 19/048 |
| 2020/0192309 A1* | 6/2020 | Kulkarni | G05B 15/02 |
| 2021/0345140 A1* | 11/2021 | Meingast | H04W 24/08 |

OTHER PUBLICATIONS

Balaji, B., Xu, J., Nwokafor, A., Gupta, R.K., & Agarwal, Y. (2013). Sentinel: occupancy based HVAC actuation using existing WiFi infrastructure within commercial buildings. SenSys '13. (Year: 2013).*

C. Groß, R. Borrison, J. Schmitt and M. Aleksy, Towards an Occupancy Count Functionality for Smart Buildings—An Industrial Perspective, doi: 10.1109/IESES45645.2020.9210641. (Year: 2020).*

K. Akkaya, I. Guvenc, R. Aygun, N. Pala and A. Kadri, "IoT-based occupancy monitoring techniques for energy-efficient smart buildings," 2015 IEEE Wireless Communications and Networking Conference Workshops (WCNCW), 2015, pp. 58-63, doi: 10.1109/WCNCW.2015.7122529. (Year: 2015).

Bondalapati, S. et al., "Occupancy Tracking Using Wireless Signal Distortion," U.S. Appl. No. 17/139,115, filed Dec. 31, 2020, 63 pages.

Bondalapati, S. et al., "Occupancy Tracking Using Sound Recognition," U.S. Appl. No. 17/139,155, filed Dec. 31, 2020, 62 pages.

Bondalapati, S. et al., "Occupancy Tracking Using Environmental Information," U.S. Appl. No. 17/139,250, filed Dec. 31, 2020, 64 pages.

* cited by examiner

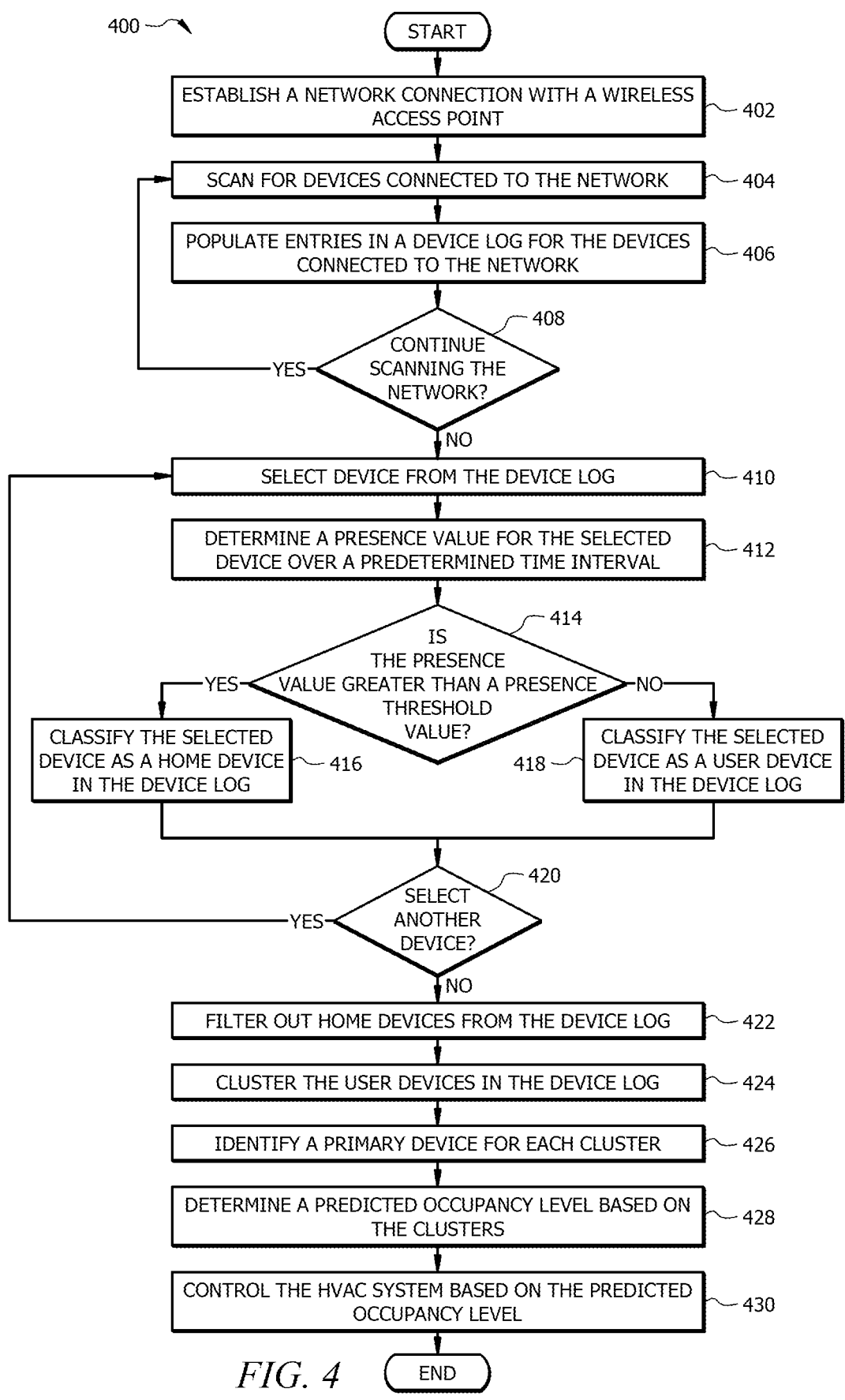

400 ⟍

START

ESTABLISH A NETWORK CONNECTION WITH A WIRELESS ACCESS POINT — 402

SCAN FOR DEVICES CONNECTED TO THE NETWORK — 404

POPULATE ENTRIES IN A DEVICE LOG FOR THE DEVICES CONNECTED TO THE NETWORK — 406

408
CONTINUE SCANNING THE NETWORK?

YES

NO

SELECT DEVICE FROM THE DEVICE LOG — 410

DETERMINE A PRESENCE VALUE FOR THE SELECTED DEVICE OVER A PREDETERMINED TIME INTERVAL — 412

414
IS THE PRESENCE VALUE GREATER THAN A PRESENCE THRESHOLD VALUE?

YES

NO

CLASSIFY THE SELECTED DEVICE AS A HOME DEVICE IN THE DEVICE LOG — 416

418 — CLASSIFY THE SELECTED DEVICE AS A USER DEVICE IN THE DEVICE LOG

420
SELECT ANOTHER DEVICE?

YES

NO

FILTER OUT HOME DEVICES FROM THE DEVICE LOG — 422

CLUSTER THE USER DEVICES IN THE DEVICE LOG — 424

IDENTIFY A PRIMARY DEVICE FOR EACH CLUSTER — 426

DETERMINE A PREDICTED OCCUPANCY LEVEL BASED ON THE CLUSTERS — 428

CONTROL THE HVAC SYSTEM BASED ON THE PREDICTED OCCUPANCY LEVEL — 430

*FIG. 4*

END

700

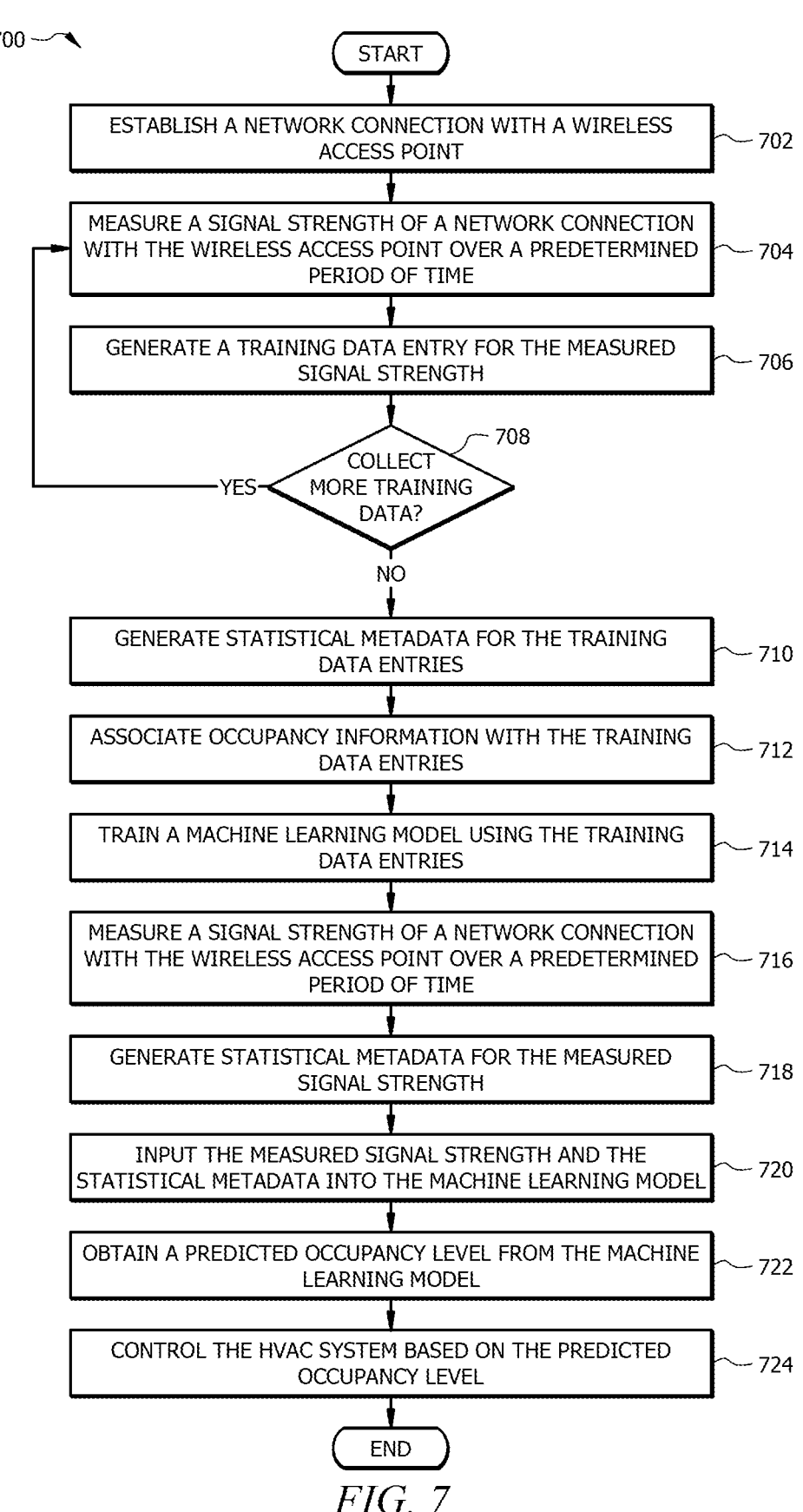

START

ESTABLISH A NETWORK CONNECTION WITH A WIRELESS ACCESS POINT — 702

MEASURE A SIGNAL STRENGTH OF A NETWORK CONNECTION WITH THE WIRELESS ACCESS POINT OVER A PREDETERMINED PERIOD OF TIME — 704

GENERATE A TRAINING DATA ENTRY FOR THE MEASURED SIGNAL STRENGTH — 706

708
COLLECT MORE TRAINING DATA?

—YES

NO

GENERATE STATISTICAL METADATA FOR THE TRAINING DATA ENTRIES — 710

ASSOCIATE OCCUPANCY INFORMATION WITH THE TRAINING DATA ENTRIES — 712

TRAIN A MACHINE LEARNING MODEL USING THE TRAINING DATA ENTRIES — 714

MEASURE A SIGNAL STRENGTH OF A NETWORK CONNECTION WITH THE WIRELESS ACCESS POINT OVER A PREDETERMINED PERIOD OF TIME — 716

GENERATE STATISTICAL METADATA FOR THE MEASURED SIGNAL STRENGTH — 718

INPUT THE MEASURED SIGNAL STRENGTH AND THE STATISTICAL METADATA INTO THE MACHINE LEARNING MODEL — 720

OBTAIN A PREDICTED OCCUPANCY LEVEL FROM THE MACHINE LEARNING MODEL — 722

CONTROL THE HVAC SYSTEM BASED ON THE PREDICTED OCCUPANCY LEVEL — 724

END

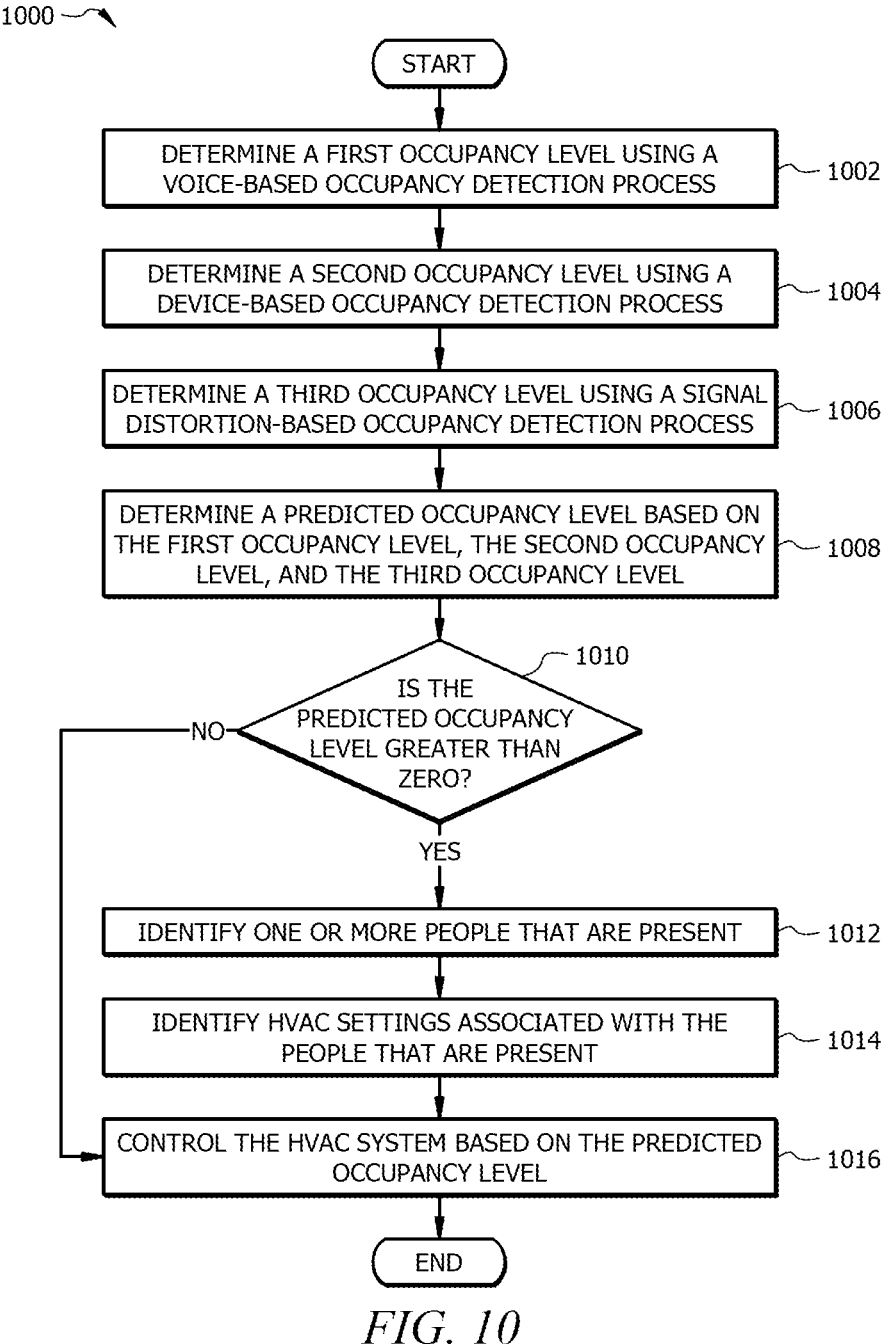

START

DETERMINE A FIRST OCCUPANCY LEVEL USING A VOICE-BASED OCCUPANCY DETECTION PROCESS ～ 1002

DETERMINE A SECOND OCCUPANCY LEVEL USING A DEVICE-BASED OCCUPANCY DETECTION PROCESS ～ 1004

DETERMINE A THIRD OCCUPANCY LEVEL USING A SIGNAL DISTORTION-BASED OCCUPANCY DETECTION PROCESS ～ 1006

DETERMINE A PREDICTED OCCUPANCY LEVEL BASED ON THE FIRST OCCUPANCY LEVEL, THE SECOND OCCUPANCY LEVEL, AND THE THIRD OCCUPANCY LEVEL ～ 1008

IS THE PREDICTED OCCUPANCY LEVEL GREATER THAN ZERO? ⌐ 1010

NO

YES

IDENTIFY ONE OR MORE PEOPLE THAT ARE PRESENT ～ 1012

IDENTIFY HVAC SETTINGS ASSOCIATED WITH THE PEOPLE THAT ARE PRESENT ～ 1014

CONTROL THE HVAC SYSTEM BASED ON THE PREDICTED OCCUPANCY LEVEL ～ 1016

END

*FIG. 10*

OCCUPANCY TRACKING USING USER DEVICE DETECTION

CROSS-REFERENCE TO RELATED APPLICATIONS

This application is a continuation of U.S. application Ser. No. 18/052,432 filed Nov. 3, 2022, by Sunil Bondalapati et al., and entitled "OCCUPANCY TRACKING USING USER DEVICE DETECTION," now U.S. Pat. No. 11,802, 712 issued Oct. 31, 2023, which is a continuation of U.S. application Ser. No. 17/139,201 filed Dec. 31, 2020 by Sunil Bondalapati et al., and entitled "OCCUPANCY TRACK-ING USING USER DEVICE DETECTION," now U.S. Pat. No. 11,536,482 issued Dec. 27, 2022, which are all incor-porated herein by reference.

TECHNICAL FIELD

The present disclosure relates generally to occupancy tracking, and more specifically to occupancy tracking using user device detection.

BACKGROUND

Determining the number of people that are present within a space (e.g. a home or office) poses a technical challenge for existing Heating, Ventilation, and Air Conditioning (HVAC) systems. Existing HVAC systems typically use a proximity sensor or a motion detection sensor to determine whether a space is occupied. Proximity sensors and motion detection sensors can only provide a binary indication of whether a space is occupied. This means that existing HVAC systems can only detect whether someone is present within a space, but they are unable to determine the number of people that are present within the space. In addition, existing HVAC systems are also unable to identify who is present within the space. Without the ability to identify the people that are present within a space, existing HVAC systems are unable to provide personalized HVAC settings that corresponds with the people that are present within the space.

SUMMARY

The system disclosed in the present application provides a technical solution to the technical problems discussed above by providing an occupancy tracking system that is configured to predict the number of people that are present within a space based on various types of environmental information within the space. In contrast to existing HVAC systems, the occupancy tracking system is configured to indicate whether a space is occupied as well as the number of people that are present within the space. By determining the number of people that are present within a space, the occupancy tracking system is able to provide better control and management of the HVAC system. This process allows the occupancy tracking system to more efficiently manage and operate the HVAC system based on the number of people that are present within a space.

In addition, the occupancy tracking system may be con-figured to identify who is present within space. This process allows the occupancy tracking system to control the HVAC system using personalized settings based on the person's personal preferences. For example, the occupancy tracking system may identify a person that is present within the space, identify HVAC settings (e.g. preferred set point temperatures) for the identified person, and then control the HVAC system using the identified HVAC settings. This process allows the occupancy tracking system to efficiently manage the HVAC system while accommodating the pref-erences of the people that are present within a space.

The disclosed system provides several practical applica-tions and technical advantages which include a process for determining the number of people that are present within a space based on voices that are heard within the space. Unlike existing HVAC systems that rely on proximity sensors and motion sensors, the occupancy tracking system captures and processes audio signals from within a space to determine the number of people that are present within the space based on the presence of voices that are captured in the audio signals. This process also allows the occupancy tracking system to filter out the voices that come from electronic devices (e.g. a television and radio) to provide a more accurate prediction of the number of people that are present within the space. The occupancy tracking system may then efficiently control the operation of the HVAC system based on the determined number of people that are present within the space.

The disclosed system also includes a process for deter-mining the number of people that are present within a space based on the user devices that are detected within the space. In this case, the occupancy tracking system identifies the devices that are connected to an access point within a space to determine the number of people that are present within the space. This process also allows the occupancy tracking system to distinguish between electronic devices (e.g. tele-visions and desktop computers) that are always present in a space and personal user devices to provide a more accurate prediction of the number of people that are present within the space. The occupancy tracking system may then effi-ciently control the operation of the HVAC system based on the determined number of people that are present within the space.

The disclosed system also includes a process for deter-mining the number of people that are present within a space based on a signal strength of a network connection between a thermostat and an access point. The occupancy tracking system monitors the signal strength of the network connec-tion over time to determine the number of people that are present within the space based on the measured signal strength. In a first phase, the occupancy tracking system collects training data that is used to train a machine learning model. The machine learning model is generally configured to predict the number of people that are present within a space based on wireless signal distortion information. The training data comprises signal strength measurements over a period of time and statistical metadata for the signal strength measurements. In a second phase, the occupancy tracking system collects current wireless signal distortion informa-tion (e.g. current signal strength measurements) and pro-vides the collected information to the trained machine learning model to obtain a predicted occupancy level for the space. The occupancy tracking system may then efficiently control the operation of the HVAC system based on the determined number of people that are present within the space.

The disclosed system also includes a process for deter-mining the number of people that are present within a space based on a combination of environmental information. For example, the occupancy tracking system may determine the number of people that are present within a space based on the voices that are heard within the space, the user devices that are detected within space, and/or the signal strength of a network connection between a thermostat and an access point. This process allows the occupancy tracking system to distinguish between electronic devices (e.g. televisions and desktop computers) that are always present in a space and personal user devices to provide a more accurate prediction of the number of people that are present within the space. This process also allows the occupancy tracking system to filter out voices that come from electronic sound sources (e.g. televisions and radios) rather than people which also provides a more accurate prediction of the number of people that are present within the space. The occupancy tracking system may then efficiently control the operation of the HVAC system based on the determined number of people that are present within the space.

In one embodiment, the system comprises a device that is configured to establish a network connection with an access point and to capture wireless signal distortion information (e.g. signal strength measurements) for the network connection. After capturing the wireless signal distortion information, the device generates statistical metadata for the wireless signal distortion information. The device then inputs the wireless signal distortion information and the statistical metadata for the wireless signal distortion information into a machine learning model. The machine learning model is configured to determine a predicted occupancy level based on the wireless signal distortion information and the statistical metadata for the wireless signal distortion information. The predicted occupancy level indicates the number of people that are present within the space. In response to providing the wireless signal distortion information and the statistical metadata to the machine learning model, the device obtains the predicted occupancy level from the machine learning model and controls a Heating, Ventilation, and Air Conditioning (HVAC) system based on the predicted occupancy level.

In another embodiment, the system comprises a device configured to record a plurality of sound samples over a predetermined time period. After recording the sound samples, the device computes an audio signature for each sound sample. The audio signature includes a numerical value that uniquely identifies the characteristics within an audio signal. The device also determines a direction of arrival for each sound sample. The device then populates entries in the voice data log for the sound samples and identifies clusters based on an audio signature that is associated with the populated entries. The device then determines a predicted occupancy level based on the number of clusters that are identified and controls an HVAC system based on the predicted occupancy level.

In another embodiment, the system comprises a device configured to identify devices connected to the access point over a predetermined time period. The device then populates entries in a device log for the identified devices. The device then determines a presence value for each device. The presence value indicates the amount of time that a device was present during the predetermined time period. The device then identifies entries that are associated with a presence value that is less than a presence threshold value and associates the identified entries with a user device classification. The device will then identify clusters for the entries that are associated with a user device classification, determine a predicted occupancy level based on the number of clusters that are identified, and control an HVAC system based on the predicted occupancy level.

In another embodiment, the system comprises a device that receives sound samples, identifies voices within the sound samples, and determines a first occupancy level based on the identified voices. The device may then identify user devices connected to an access point and determine a second occupancy level based on the user devices that are connected to the access point. The device may then measure a signal strength of a network connection with the access point and determine a third occupancy level based on the signal strength of the network connection with the access point. The device then determines a predicted occupancy level based on the first occupancy level, the second occupancy level, and the third occupancy level and controls an HVAC system based on the predicted occupancy level.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a flowchart of an embodiment of an occupancy tracking process using user device detection;

FIG. 7 is a flowchart of an embodiment of an occupancy tracking process using wireless signal distortion;

FIG. 10 is a flowchart of an embodiment of an occupancy tracking process using environmental information;

DETAILED DESCRIPTION

System Overview

Figure 1:
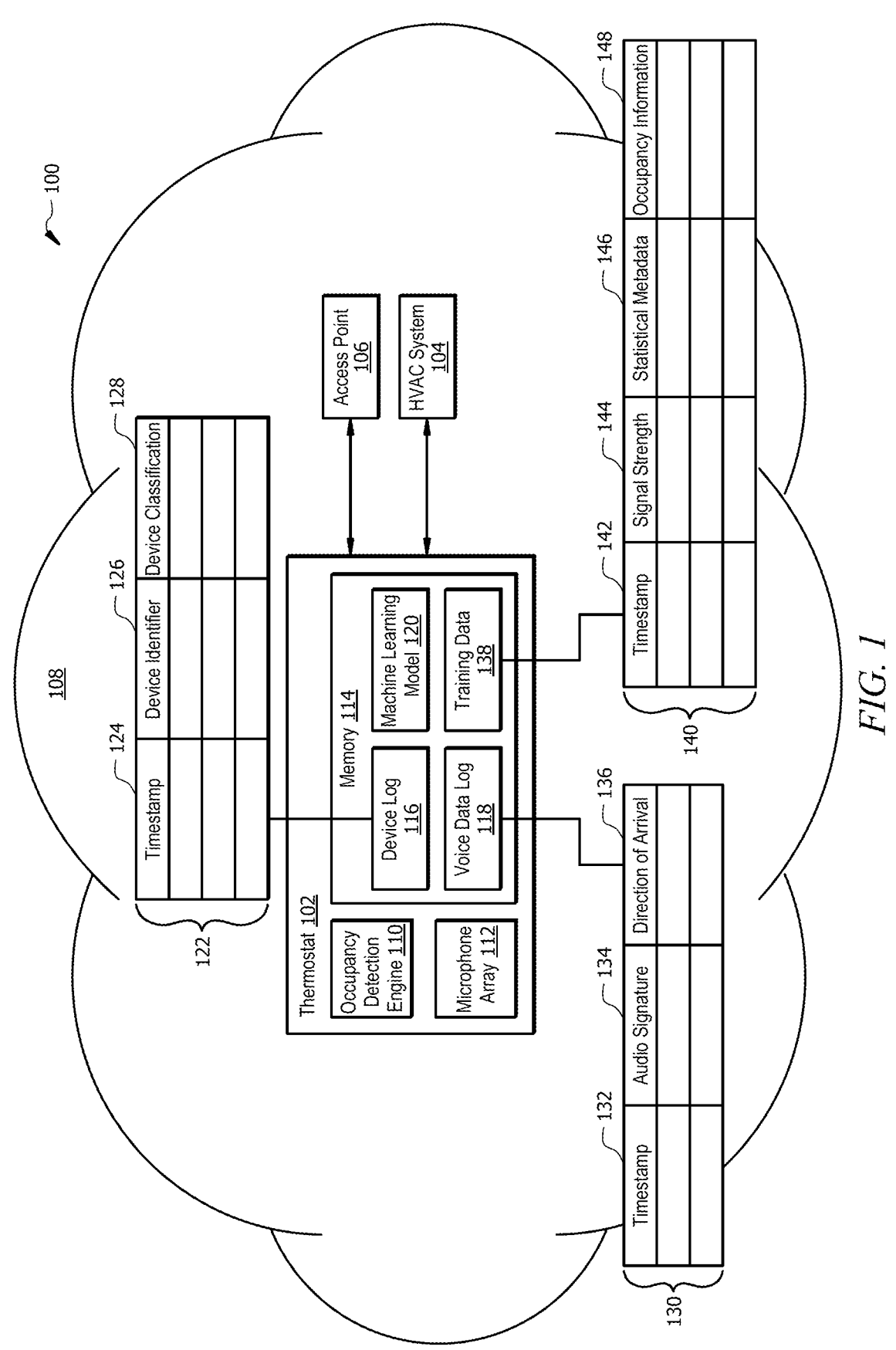
FIG. 1 is a schematic diagram of an embodiment of an occupancy tracking system for heating, ventilation, and air conditioning (HVAC) systems.

FIG. 1 is a schematic diagram of an embodiment of an occupancy tracking system 100 for heating, ventilation, and air conditioning (HVAC) systems 104. The occupancy tracking system 100 is generally configured to collect various type of data (e.g. audio signals, wireless signal strength information, device information, etc.) that is associated with the conditions within a physical location, to determine a predicted number of people that are present within the physical location, and to control the HVAC system 104 based on the predicted number of people that are present within the physical location.

Existing HVAC systems typically use a proximity sensor or a motion detection sensor to determine whether a space (e.g. a home or office) is occupied. Proximity sensors and motion detection sensors can only provide a binary indication of whether a space is occupied. These types of sensors are unable to determine the number of people that are present within the space. In contrast, the occupancy tracking system 100 is configured to indicate whether a space is occupied as well as the number of people that are present within the space. By determining the number of people that are present within a space, the occupancy tracking system 100 is able to provide better control and management of the HVAC system 104. For example, when a large number of people are detected within a space, the occupancy tracking system 100 may adjust the settings of the HVAC system 104 to reach its target set point temperature in a shorter amount of time. This process allows the occupancy tracking system 100 to efficiently manage the HVAC system 104 based on the number of people that are present within a space.

In addition, existing HVAC systems are also unable to identify who is present within a space. In contrast, the occupancy tracking system 100 is configured to identify who is present within space. This process allows the occupancy tracking system 100 control the HVAC system 104 using personalized settings based on the person's personal preferences. For example, the occupancy tracking system 100 may identify a person that is present within the space, identify HVAC settings (e.g. preferred set point temperatures) for the identified person, and control the HVAC system 104 using the identified HVAC settings. This process allows the occupancy tracking system 100 to efficiently manage the HVAC system 104 while accommodating the preferences of the people that are present within a space.

In one embodiment, the occupancy tracking system 100 comprises a thermostat 102, an HVAC system 104, and an access point 106 that are in signal communication with each other over a network 108. The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

HVAC System

An HVAC system 104 is generally configured to control the temperature of a space. Examples of a space include, but are not limited to, a room, a home, an apartment, a mall, an office, a warehouse, or a building. The HVAC system 104 may comprise the thermostat 102, compressors, blowers, evaporators, condensers, and/or any other suitable type of hardware for controlling the temperature of the space. An example of an HVAC system 104 configuration and its components are described in more detail below in FIG. 12. Although FIG. 1 illustrates a single HVAC system 104, a location or space may comprise a plurality of HVAC systems 104 that are configured to work together. For example, a large building may comprise multiple HVAC systems 104 that work cooperatively to control the temperature within the building.

Access Points

An example of an access point 106 is a wired or wireless modem or router. An access point 106 is generally configured to provide networking capabilities to the thermostat 102, the HVAC system 104, and other devices within the space. The access point 106 may be configured to establish a network connection with the thermostat 102 and to provide data to the thermostat 102. For example, the access point 106 may be configured to send information about the devices that are connected to the access point 106 to the thermostat 102. In other examples, the access point 106 may be configured to send any other suitable type of data to the thermostat 102. Examples of the access point 106 in operation are described below in FIGS. 4-10.

Thermostat

The thermostat 102 is generally configured to collect various type of data (e.g. audio signals, wireless signal strength information, device information, etc.) about the conditions within a space, to determine a predicted number of people that are present within the space, and to control the HVAC system 104 based on the predicted number of people that are present within the space. Examples of the thermostat 102 in operation are described below in FIGS. 2-12.

In one embodiment, the thermostat 102 comprises an occupancy detection engine 110, a microphone array 112, and a memory 114. The thermostat 102 may further comprise a graphical user interface, a display, a touch screen, buttons, knobs, or any other suitable combination of components. Additional details about the hardware configuration of the thermostat 102 are described in FIG. 11. The occupancy detection engine 110 is generally configured to predict the number of people that are present within a space and to control the operation of the HVAC system 104 based on the predicted number of people within the space. As an example, the occupancy detection engine 110 may be configured to adjust a set point temperature based on the predicted number of people within the space. As another example, the occupancy detection engine 110 may be configured to transition the HVAC system 104 into a low power mode or out of a low power mode based on the predicted number of people within the space. In other examples, the occupancy detection engine 110 may be configured to perform any other suitable type of operation to control the operation of the HVAC system 104 based on the predicted number of people within the space. Examples of the occupancy detection engine 110 in operation are described in FIGS. 2-10.

The memory 114 is configured to store a device log 116, a voice data log 118, a machine learning model 120, and/or any other suitable type of data. The device log 116 is generally configured to store device information that is associated with devices that are connected to the access point 106 within a space. Examples of devices include, but are not limited to, televisions, radios, desktop computers, smart appliances, Internet-of-things devices, smartphones, tablets, smartwatches, smart glasses, laptop computers, or any other suitable type of electronic device. The thermostat 102 is configured to process and use the stored device information to predict the number of people that are present within the space based on the devices that are currently connected to the access point 106. The device log 116 comprises a plurality of entries 122 that are each associated with a device that is connected to the access point 106. In one embodiment, each entry 122 comprises a timestamp 124 that identifies when a device was detected, a device identifier 126 that identifies the device, and a device classification 128 that identifies the device type. In other examples, each entry 122 may comprise any other suitable type or combination of information that is associated with the devices that are connected to the access point 106.

The voice data log 118 is generally configured to store information that is associated with sound samples that are captured within a space. The thermostat 102 is configured to process and use the stored sound samples to predict the number of people that are present within the space based on the voices that are detected within the space. The voice data log 118 comprises a plurality of entries 130 that are each associated with an audio signal 306 that is recorded within the space. In one embodiment, each entry 130 comprises a timestamp 132 that identifies when an audio signal 306 was recorded, an audio signature 134 that identifies characteristics of sounds within the audio signal 306, and a direction of arrival 136 that identifies a location of a sound source for the audio signal 306. In other examples, each entry 130 may comprise any other suitable type or combination of information that is associated with an audio signal 306.

Examples of machine learning models 120 include, but are not limited to, a multi-layer perceptron or any other suitable type of neural network model. The machine learning models 120 are generally configured to output a predicted number of people that are within a space based on the current signal strength of a network connection between the thermostat 102 and the access point 106. In one embodiment, a machine learning model 120 is configured to receive wireless signal distortion information (e.g. a signal strength measurement 144) and statistical metadata 146 for the wireless signal distortion information as inputs and to output a predicted occupancy level based on the wireless signal distortion information and the statistical metadata 146 for the wireless signal distortion information. The statistical metadata 146 comprises statistical metrics that are associated with a measured signal strength over a period of time. For example, the statistical metadata 146 may comprise a mean value, a standard deviation value, a skew value, a variance value, a maximum signal strength value, a minimum signal strength value, or any other suitable type of statistical information associated with the wireless signal distortion information.

The machine learning model 120 is trained using training data 138. The training data 138 comprises a plurality of entries 140. In one embodiment, each entry 140 comprises a timestamp 142, a signal strength measurement 144, statistical metadata 146 for the signal strength measurement 144, and the number of occupants that are present within a space. During the training process, the machine learning model 120 determines weight and bias values for a mapping function that allows the machine learning model 120 to map different combinations of wireless signal distortion information (e.g. a signal strength measurement 144), statistical metadata 146, and occupancy information to a predicted occupancy level. Through this process, the machine learning model 120 is configured to determine a predicted occupancy level for a space that best corresponds with the wireless signal distortion information (e.g. a signal strength measurement 144), statistical metadata 146, and the occupancy information. The occupancy detection engine 110 may train the machine learning model 120 using any suitable technique as would be appreciated by one of ordinary skill in the art.

Occupancy Tracking Process Overview

Figure 2:
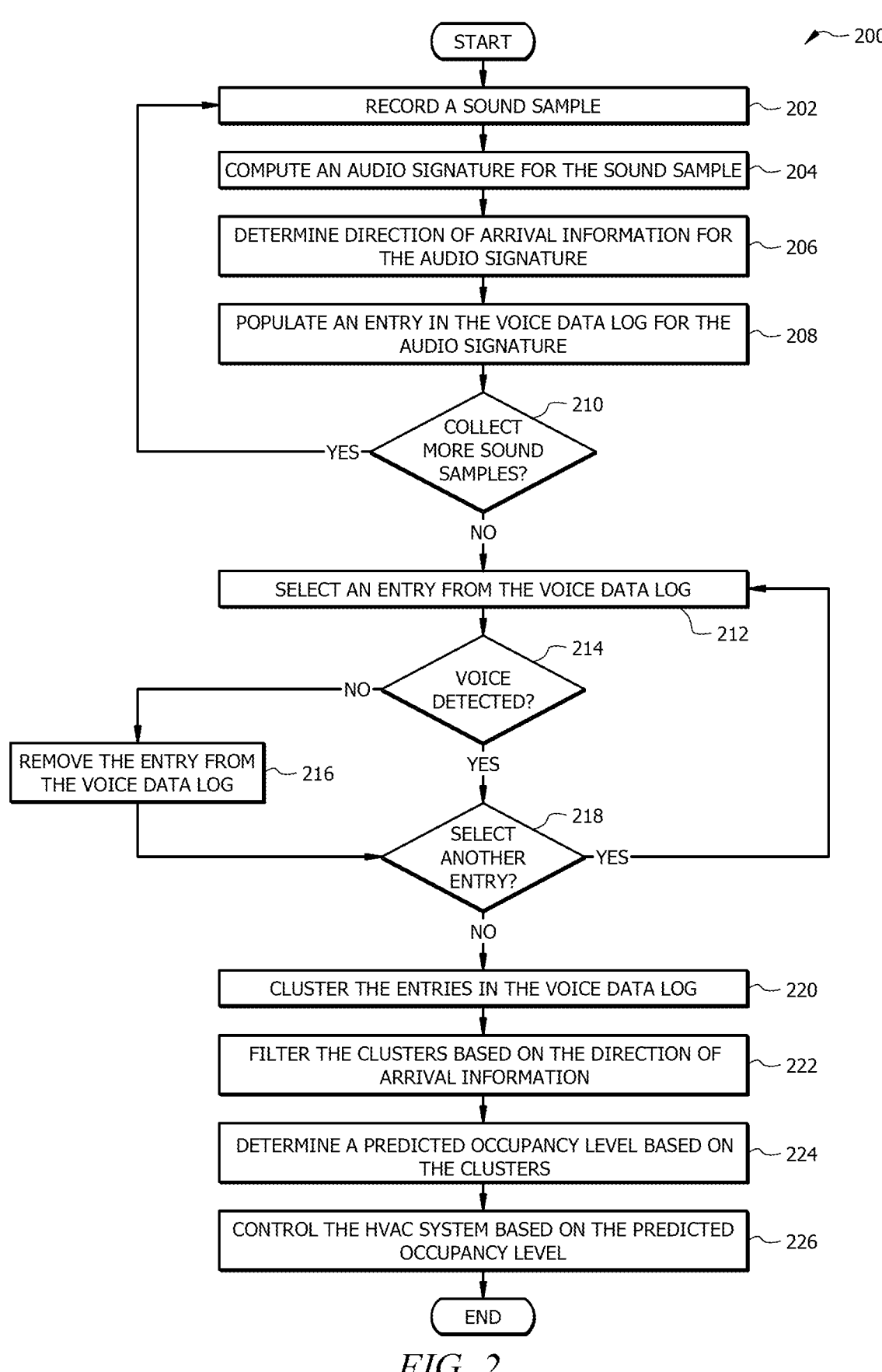
FIG. 2 is a flowchart of an embodiment of an occupancy tracking process using sound recognition.
Figure 3:
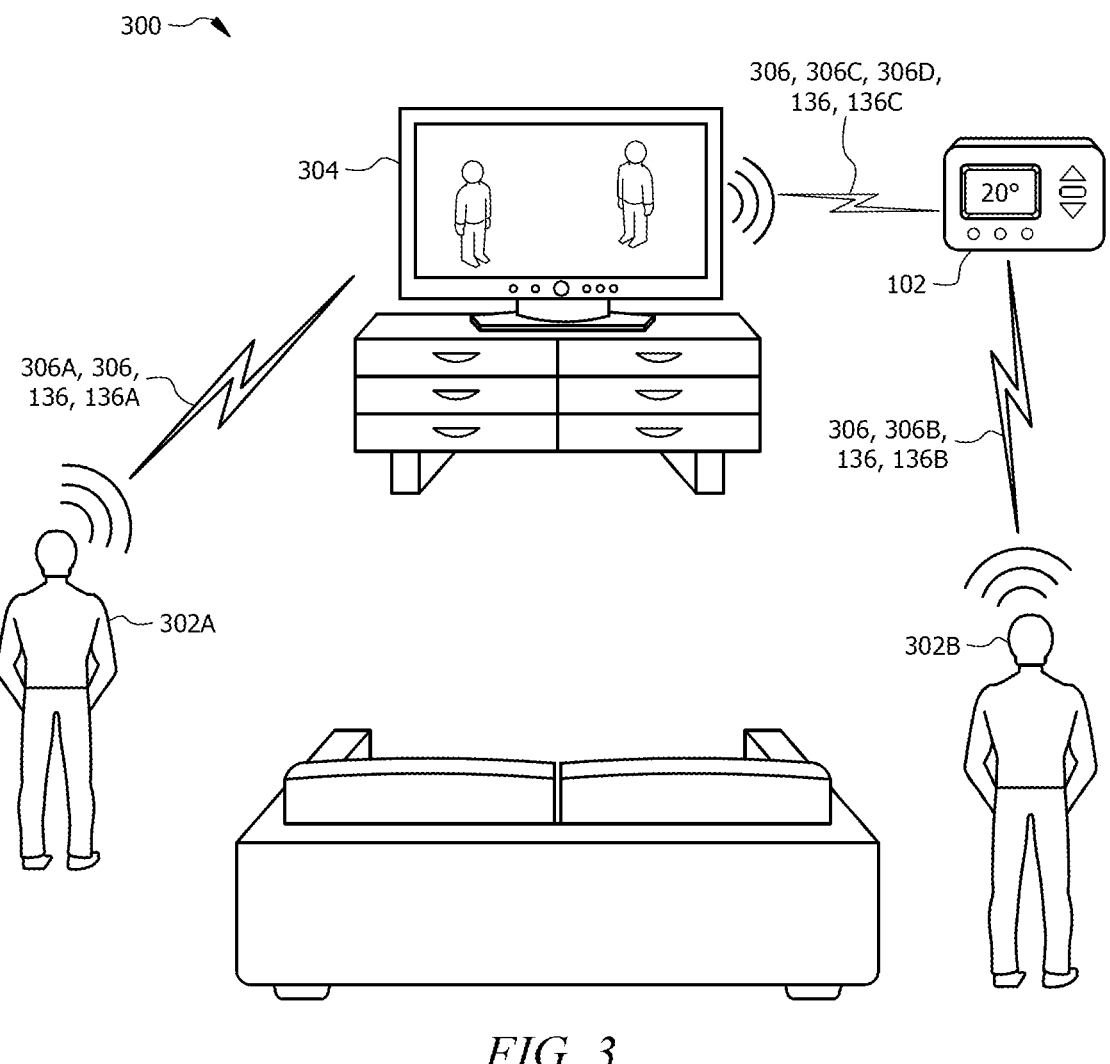
FIG. 3 is an example of the occupancy tracking system employing the occupancy tracking process using sound recognition.
Figure 5:
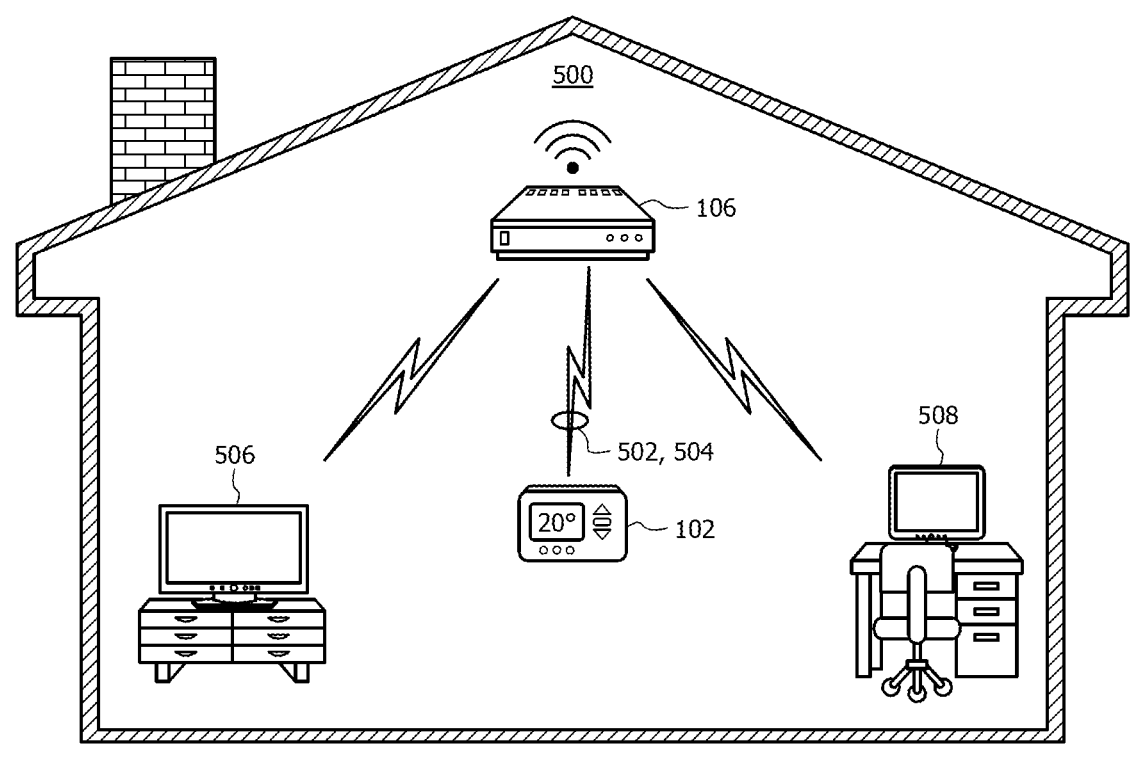
FIGS. 5 and 6 are an example of the occupancy tracking system employing the occupancy tracking process using user device detection.
Figure 6:
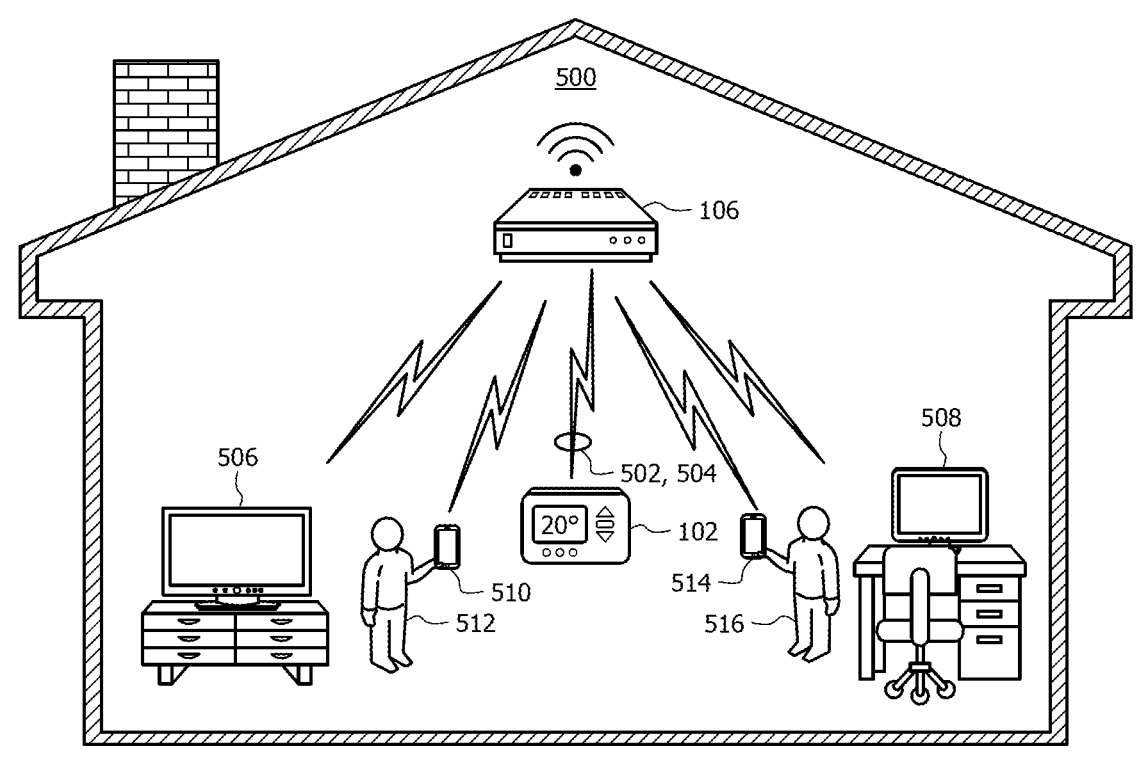
Figure 8:
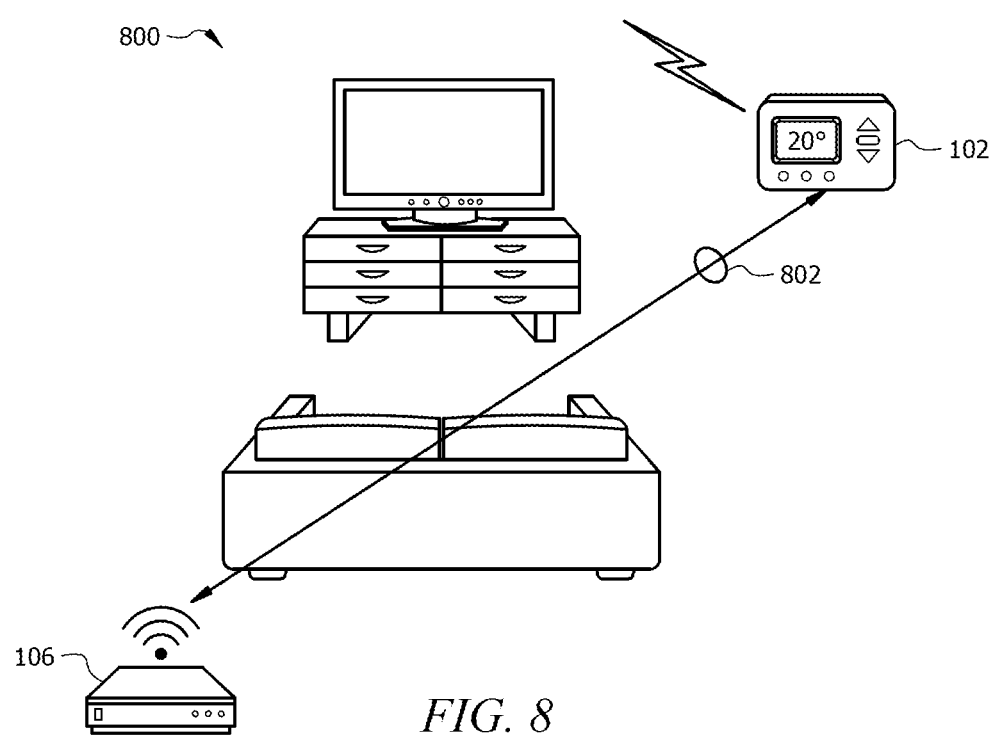
FIGS. 8 and 9 are an example of the occupancy tracking system employing the occupancy tracking process using wireless signal distortion.
Figure 9:
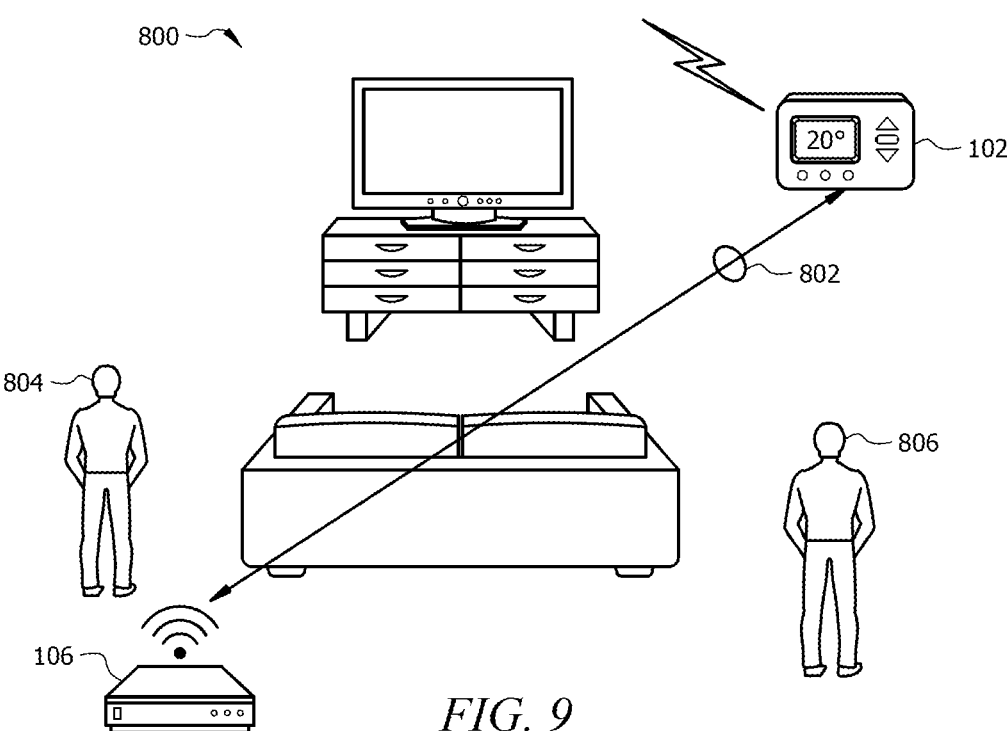

FIGS. 2 and 3 are an example a process for determine the number of people that are present in a space using sound recognition. FIGS. 4-6 are an example a process for determine the number of people that are present in a space using user device detection. FIGS. 7-9 are an example a process for determine the number of people that are present in a space using wireless signal distortion. FIG. 10 is an example a process for determine the number of people that are present in a space using a combination of environmental information.

Occupancy Tracking Process Using Sound Recognition

FIG. 2 is a flowchart of an embodiment of an occupancy tracking process 200 using sound recognition. The occupancy tracking system 100 may employ process 200 to determine the number of people that are present within a space based on voices that are heard within the space. Unlike existing HVAC systems that rely on proximity sensors and motion sensors, the occupancy tracking system 100 is able to capture and process audio signals 306 from within a space. The occupancy tracking system 100 determines the number of people that are present within the space based on the voices that are captured in the audio signals 306. Process 200 also allows the occupancy tracking system 100 to filter out the voices from electronic devices (e.g. televisions and radio) to provide a more accurate prediction of the number of people that are present within the space. Process 200 also allows the occupancy tracking system 100 to efficiently control the operation of the HVAC system 104 based on the determined number of people that are present within the space.

At step 202, the thermostat 102 records a sound sample. The thermostat 102 uses the microphone array 112 to capture a sound sample of an audio signal 306 from within a space. The thermostat 102 uses the microphone array 112 to record sounds and voices that are present within the space. The thermostat 102 may be configured to record sound samples continuously or at predetermined time intervals. For example, the thermostat 102 may be configured to continuously record sound samples in three-minute segments. In this example, the thermostat 102 records a new sound sample every three minutes and each sound sample has a duration of three minutes. In other examples, the thermostat 102 may be configured to record sound samples at any other suitable time interval. The thermostat 102 may also record sound samples for any other suitable duration of time. In some examples, the thermostat 102 may be configured to record sound samples in response to detecting a noise. For instance, any noise or sound may be used as a trigger event to trigger the thermostat 102 to record sound samples.

Referring to the example shown in FIG. 3, the thermostat 102 may be located in a space 300 (e.g. a living room area) near a television 304. In this example, a first person 302A and a second person 302B are also located in the living while the television 304 is playing, The thermostat 102 records a sound sample that comprises a first audio signal 306A, a second audio signal 306B, a third audio signal 306C, and a fourth audio signal 306D. The first audio signal 306A corresponds with a voice from the first person 302A speaking. The second audio signal 306B corresponds with a voice from the second person 302B speaking. The third audio signal 306C and the fourth audio signal 306D corresponds with two voices coming from the television 304.

Returning to FIG. 2 at step 204, the thermostat 102 computes an audio signature 134 for the sound sample. An audio signature 134 is a numerical value that uniquely identifies the characteristics of the sounds (e.g. voices) within an audio signal 306. In one example, the thermostat 102 may compute an audio signature 134 by determining Mel-frequency cepstral coefficients (MFCCs) for the audio signal 306. In this example, the thermostat 102 may process the sound sample to identify MFCC features or characteristics that are present within the audio signal 306. The thermostat 102 may then generate a numeric value based on the identified MFCC features. In other examples, the thermostat 102 may compute the audio signature 134 using any other suitable signal processing technique.

Continuing with the example in FIG. 3, the thermostat 102 processes the recorded sound sample and computes an audio signature 134 for each of the distinct voices that are found in the sound sample. Here, the thermostat 102 computes an audio signature 134 for each of the audio signals 306 that is present in the sound sample. In this example, the thermostat 102 computes a first audio signature 134 for the first audio signal 306A, a second audio signature 134 for the second audio signal 306B, a third audio signature 134 for the third audio signal 306C, and a fourth audio signature 134 for the fourth audio signal 306D.

Returning to FIG. 2 at step 206, the thermostat 102 determines direction of arrival information for the audio signature 134. The direction of arrival 136 indicates a direction that an audio signal 306 is propagating from. In other words, the direction of arrival 136 indicates the relative location of a sound source for an audio signal 306 with respect to the thermostat 102. In one embodiment, the thermostat 102 may determine a direction of arrival 136 based on the order that microphones in the microphone array 112 hear an audio signal 306. For example, the thermostat 102 may determine the direction of arrival 136 using a generalized cross-correlation phase transformation algorithm with the microphone array 112. In other examples, the thermostat 102 may determine the direction of arrival 136 using any other suitable algorithm or technique. The thermostat 102 is configured to determine a direction of arrival 136 for each of the audio signals 306 that is present in the sound sample.

Continuing with the example in FIG. 3, the thermostat 102 determines a first direction of arrival 136A for the first audio signal 306A and a second direction of arrival 136B for the second audio signal 306B. In this example, the thermostat 102 determines that the third audio signal 306C and the fourth audio signal 306D are both associated with the same direction of arrival 136C. This means that the third audio signal 306C and the fourth audio signal 306D came from the same location (i.e. the same sound source).

Returning to FIG. 2 at step 208, the thermostat 102 creates an entry 130 in the voice data log 118 for the audio signature 134. Continuing with the example in FIG. 3, the thermostat 102 may create a first entry 130 in the voice data log 118 for the first audio signal 306A. The first entry 130 may comprise a timestamp 132 that identifies when the first audio signal 306A was recorded, the first audio signature 134 for the first audio signal 306A, and the direction of arrival 136A for the first audio signal 306A. In some examples, the first entry 130 may further comprise any other suitable type of information that is associated with the first audio signal 306A. The thermostat 102 repeats this process to create a second entry 130, a third entry 130, and a fourth entry 130 for the second audio signal 306B, the third audio signal 306C, and the fourth audio signal 306D, respectively.

At step 210, the thermostat 102 determines whether to collect more sound samples. In one embodiment, the thermostat 102 may be configured to collect sound samples for a predetermined amount of time. For example, the thermostat 102 may be configured to collect sound samples over a time period of nine minutes. In other examples, the thermostat 102 may be configured to collect sound samples over any other suitable amount of time. When the predetermined amount of time has not elapsed, the thermostat 102 will continue to collect sound samples until the predetermined amount of time has elapsed. The thermostat 102 returns to step 202 in response to determining to collect additional sound samples. In this case, the thermostat 102 returns to step 202 to continue recording additional sound samples. After the predetermined amount of time elapses, the thermostat 102 may begin processing the entries 130 in the voice data log 118 for the recorded sound samples. In this case, the thermostat 102 proceeds to step 212 in response to determining not to collect additional sound samples.

At step 212, the thermostat 102 iteratively selects an entry 130 from the voice data log 118 to process. Here, the thermostat 102 begins selecting entries 130 from the voice data log 118 for processing. In one embodiment, the selects entries 130 from the voice data log 118 in a First-In-First-Out (FIFO) order.

At step 214, the thermostat 102 determines whether a voice was detected within the audio signature 134 that is associated with the selected entry 130. In one embodiment, the thermostat 102 may analyze the audio signature 134 to determine whether a voice was present within the audio signal 306. The thermostat 102 proceeds to step 216 in response to determining that a voice was not detected in the selected entry 130. In this case, the thermostat 102 determines that the recorded audio signal 306 that corresponds with the selected entry 130 only includes noises and does not include a voice that would indicate that a person was present within the space 300. For example, the audio signal 306 may correspond with an alarm going off, noises from pets, or music playing. At step 216, the thermostat 102 removes the selected entry 130 from the voice data log 118. In this case, the thermostat 102 removes the entry 130 since the corresponding audio signal 306 cannot be used to determine whether a person was present within the space 300.

Returning to step 214, the thermostat 102 proceeds to step 218 in response to determining that a voice was detected in the selected entry 130. In this case, the thermostat 102 determines that the recorded audio signal 306 that corresponds with the selected entry 130 contains a voice which indicates that a person may be present within the space 300. Since the selected entry 130 contain a voice, the thermostat 102 will preserve the selected entry 130 for further processing.

At step 218, the thermostat 102 determines whether to select another entry 130 from the voice data log 118. In one embodiment, the thermostat 102 may be configured to process a predetermined number of entries 130 before proceeding with further processing. This process ensures that the thermostat 102 has a suitable number of entries 130 remaining to process after filtering out the entries 130 that do not contain a voice. The thermostat 102 returns to step 212 in response to determining to select another entry 130 from the voice data log 118. In this case, the thermostat 102 returns to step 212 to process additional entries 130. The thermostat 102 proceeds to step 220 in response to determining not to select another entry 130 from the voice data log 118. In this case, the thermostat 102 determines that a suitable amount of entries 130 are available for further processing and clustering.

At step 220, the thermostat 102 clusters the remaining entries 130 in the voice data log 118. Here, the thermostat 102 begins clustering the remaining entries 130 in the voice data log 118 based on their audio signatures 134. The thermostat 102 uses the audio signatures 134 to determine entries 130 in the voice data log 118 have a common sound source. In other words, the thermostat 102 uses the audio signatures 134 to identify entries 130 that correspond with the same person speaking. This process allows the thermostat 102 to determine the number of people that are present based on their voices. Each cluster corresponds with a different person that is present within the space. In one embodiment, the thermostat 102 may cluster the entries 130 in the voice data log 118 using a Bayesian Information Criterion (BIC) greedy clustering algorithm. For example, the thermostat 102 may use audio signatures 134 that are derived from MFCC features. In this example, the thermostat 102 may compare the MFCC features from an entry 130 to the MFCC features of the other entries 130 in the voice data log 118 to identify entries with similar MFCC features. The thermostat 102 may then cluster the entries 130 that have similar MFCC features. In other examples, the thermostat 102 may cluster together entries 130 in the voice data log 118 using any other suitable type or combination of criteria. In other embodiments, the thermostat 102 may cluster the entries 130 in the voice data log 118 using any other suitable algorithm or technique.

Continuing with the example in FIG. 3, the thermostat 102 may identify four clusters. In this example, a first cluster corresponds with the first audio signal 306A, a second cluster corresponds with the second audio signal 306B, a third cluster corresponds with the third audio signal 306C, and a fourth cluster corresponds with the fourth audio signal 306D.

Returning to FIG. 2 at step 222, the thermostat 102 filters the clusters based on the direction of arrival information. When multiple clusters share the same direction of arrival 136 location, this indicates that these clusters share the same sound source. Typically, when the same sound source generates multiple voices this indicates that the sound source in an electronic device (e.g. a television or radio) and that the sound source is not a person. Here, the thermostat 102 identifies the clusters that share a common sound source and removes the clusters from consideration. This process allows the thermostat 102 to filter out the electronic devices which are not actual people that are present within the space 300.

Continuing with the example in FIG. 3, the thermostat 102 determines that the third cluster and the fourth cluster have the same direction of arrival 136C. In this example, the thermostat 102 determines that the third cluster and the fourth cluster correspond with the same sound source (i.e. the television 304). This means that the audio signals 306 (i.e. the third audio signal 306C and the fourth audio signal 306D) corresponding with the third cluster and the fourth cluster are from an electronic device and are not from a person that is present in the space 300. In this case, the thermostat 102 will remove the third cluster and the fourth cluster from consideration. In some embodiments, the thermostat 102 may also remove the entries 130 that are associated with the third cluster and the fourth cluster from the voice data log 118.

Returning to FIG. 2 at step 224, the thermostat 102 determines a predicted occupancy level based on the clusters. The thermostat 102 sets the predicted occupancy level to the number of remaining clusters after filtering. Each cluster corresponds with a different person that is present within the space. Continuing with the example in FIG. 3, the thermostat 102 determines that there are two people present within the space 300.

At step 226, the thermostat 102 controls the HVAC system 104 based on the predicted occupancy level. As an example, the thermostat 102 may be configured to adjust a set point temperature based on the predicted number of people within the space 300. In this example, the thermostat 102 may increase or decrease a set point temperature for the space 300 based on the predicted number of people that are present within the space.

As another example, the thermostat 102 may be configured to transition the HVAC system 104 into a low power mode based on the predicted number of people within the space 300. For instance, the thermostat 102 may transition the HVAC system from a normal operation mode (e.g. a home mode) to a low power mode (e.g. an away mode) when the thermostat 102 determines that no one is present in the space 300. This configuration allows the HVAC system 104 to conserve energy when no one is present within the space 300.

As another example, the thermostat 102 may be configured to transition the HVAC system 104 out of a low power mode based on the predicted number of people within the space 300. For instance, the thermostat 102 may transition the HVAC system 104 from a low power mode (e.g. an away mode) to a normal operation mode (e.g. a home mode) when the thermostat 102 determines that someone is present within the space 300. This configuration allows HVAC system 104 to resume normal operation when someone is present within the space 300.

In other examples, the occupancy detection engine 110 may be configured to perform any other suitable type of operation to control the operation of the HVAC system 104 based on the predicted number of people within the space 300.

Occupancy Tracking Process Using User Device Detection

FIG. 4 is a flowchart of an embodiment of an occupancy tracking process 400 using user device detection. The occupancy tracking system 100 may employ process 400 to determine the number of people that are present within a space based on the user devices that are detected within the space. Unlike existing HVAC systems that rely on proximity sensors and motion sensors, the occupancy tracking system 100 is able to determine which devices are connected to the access point 106 within a space and to determine the number of people that are present within the space based on the user devices that are detected. Process 400 also allows the occupancy tracking system 100 to distinguish electronic devices (e.g. televisions and desktop computers) that are always present in a space from personal user devices to provide a more accurate prediction of the number of people that are present within the space. Process 400 also allows the occupancy tracking system 100 to efficiently control the operation of the HVAC system 104 based on the determined number of people that are present within the space.

At step 402, the thermostat 102 establishes a network connection with an access point 106. As an example, the thermostat 102 may join a WiFi network that is associated with the access point 106. In other examples, the thermostat 102 may join a Zigbee network, a Z-wave network, an RF network, or any other suitable type of network that is associated with the access point 106. After establishing the network connection with the access point 106, the thermostat 102 is able to exchange (i.e. send and receive) data with the access point 106. Referring to FIG. 5 as an example, the thermostat 102 establishes a network connection with an access point 106 that is located within a space 500 (e.g. a home).

At step 404, the thermostat 102 obtains device information 504 for devices that are connected to the network 108. Continuing with the example in FIG. 5, the thermostat 102 may send a request 502 to the access point 106 to query the access point 106 about the devices that are currently connected to the network 108. In response to receiving the request 502, the access point 106 may scan (e.g. an Address Resolution Protocol (ARP) scan) the network 108 to identify the devices that are currently connected to the network 108. After identifying the devices that are currently connected to the network 108, the access point 106 sends the device information 504 about the identified devices to the thermostat 102. In some embodiments, the thermostat 102 may periodically receive device information 504 from the access point 106 about the devices that are currently connected to the network 108. In this case, the access point 106 may periodically scan the network 108 to identify the devices that are currently connected to the network 108 and may send device information 504 about the identified devices to the thermostat 102. The thermostat 102 may receive Media Access Control (MAC) addresses, Internet Protocol (IP) addresses, serial numbers, product names, or any other suitable type of identifier for the devices that are connected to the network 108. In this example, the thermostat 102 receives device information 504 that identifies a first device 506 (e.g. a television) and a second device 508 (e.g. a desktop computer).

Returning to FIG. 4 at step 406, the thermostat generates entries 122 in a device log 116 for the devices that are connected to the network 108. Continuing with the example in FIG. 5, the thermostat 102 may create a first entry 122 in the device log 116 for the first device 506 (e.g. the television) and a second entry 122 in the device log 116 for the second device 508 (e.g. the desktop computer). The first entry 122 may comprise a timestamp 124 that identifies the time when the first device 506 was detected and a device identifier 126 (e.g. a MAC address) for the first device 506. Similarly, the second entry 122 may comprise a timestamp 124 that identifies the time that the second device 508 was detected and a device identifier 126 (e.g. a MAC address) for the second device 508.

Returning to FIG. 4 at step 408, the thermostat 102 determines whether to continue scanning the network 108 for devices. In one embodiment, the thermostat 102 may be configured to continue scanning the network 108 for a predetermined amount of time. The thermostat 102 may use a timer to determine whether the predetermined amount of time has elapsed. The thermostat 102 determines to continue scanning the network 108 when the timer has not expired. Otherwise, the thermostat 102 determines to discontinue scanning the network 108 when the timer has elapsed. The thermostat returns to step 404 in response to determining to continue scanning the network 108 for devices.

Referring to FIG. 6 as an example, the thermostat 102 may return step 404 in response to determining to continue scanning the network 108 for devices. In this example, the thermostat 102 sends another request 502 to the access point 106 to request device information 504 that identifies the devices that are currently connected to the network 108. The thermostat 102 receives device information 504 that identifies the first device 506 (e.g. the television), the second device 508 (e.g. the desktop computer), a third device 510, and a fourth device 514. The third device 510 is a smartphone for a first person 512 and the fourth device 514 is a smartphone for a second person 516. The thermostat 102 will then create new entries 122 in the device log 116 for the first device 506, the second device 508, the third device 510, and the fourth device 514.

Returning to FIG. 4 at step 408, the thermostat 102 proceeds to step 410 in response to determining not to scan the network 108 for devices. At step 410, the thermostat 102 selects a device from the device log 116. After recording a list of devices that are present within the space 500 over the predetermined period of time, the thermostat 102 then begins to classify the devices. The thermostat 102 iteratively selects devices from the device log 116 to determine a classification for the device. In one embodiment, the thermostat 102 classifies a device as either a home device or a user device. A home device is a device that is usually present within the space 500 most of the time. Examples of home devices include, but are not limited to, televisions, radios, desktop computers, smart appliances, Internet-of-things devices, or any other suitable type of device. A user device is a device that is associated with a particular person that is not always present within the space 500. In other words, a user device is a portable device that a person can take with them when they leave the space 500. Examples of user devices include, but are not limited to, smartphones, tablets, smartwatches, smart glasses, laptop computers, or any other suitable type of portable device. In this example, the thermostat 102 classifies a device based on the amount of time that the device is present within the space 500. Devices that are present within the space 500 for most of the time are classified as a home device. Whereas, devices that are not always present within the space 500 are classified as user devices.

At step 412, the thermostat 102 determines a presence value for the selected device over the predetermined time interval. The presence value is a numerical value that indicates how long a device is present within the space 500. The thermostat 102 uses the timestamps 124 from the entries 122 that are associated with the selected device to determine how long the selected device has been present within the space 500. In one embodiment, the presence value identifies a percentage of time that the selected device was present within the space 500 over the predetermined time interval. As an example, the predetermined time period may be seven days. When the selected device has been present within the space 500 for the entire seven-day time period, the thermostat 102 may determine that the presence value for the selected device is 1.0 or 100%. When the selected device has been present within the space 500 for half of the seven-day time period, the thermostat 102 may determine that the presence value of the selected device is 0.5 or 50%. In other examples, the thermostat 102 may assign any other suitable presence value to the selected device to indicate how long the selected device was present within the space 500.

At step 414, the thermostat 102 determines whether the presence value is greater than a presence threshold value. The present threshold value indicates a maximum amount of time that a device can be present within the space 500 to be considered a user device. For example, the presence threshold value may be set to a value of 0.99 or 99%. In this example, a device is classified as a user device when the device is present within the space 500 less than 99% of the time (i.e. the predetermined time interval). Conversely, the device is classified as a home device when the device is present within the space 500 more than 99% of the time. In other examples, the presence threshold value may be set to any other suitable value for classifying devices. The thermostat 102 compares the determined presence value for the selected device to the presence threshold value to determine a classification for the selected device.

The thermostat 102 proceeds to step 416 in response to determining that the presence value is greater than a presence threshold value. In this case, the thermostat 102 determines that the presence value that is associated with the selected device exceeds the maximum amount of time that a device can be present within the space 500 to be considered a user device. At step 416, the thermostat 102 classifies the selected device as a home device in the device log 116.

Returning to step 414, the thermostat 102 proceeds to step 418 in response to determining that the presence value is less than a presence threshold value. In this case, the thermostat 102 determines that the presence value that is associated with the selected device less than the maximum amount of time that a device can be present within the space 500 to be considered a user device. At step 418, the thermostat 102 classifies the selected device as a user device in the device log 116.

At step 420, the thermostat 102 determines whether to select another device from the device log 116. The thermostat 102 may iteratively select devices from the device log 116 until all of the devices have been classified. The thermostat 102 may determine to select another device when one or more devices in the device log 116 have not been classified. Otherwise, the thermostat 102 may determine to not select another device when all of the devices in the device log 116 have been classified. The thermostat 102 returns to step 410 in response to determining to select another device from the device log 116 to classify. In this case, the thermostat 102 returns to step 410 to repeat the process of selecting a device and classifying the device based on its presence value.

The thermostat 102 proceeds to step 422 in response to determining not to select another device from the device log 116. At step 422, the thermostat 102 filters out the home devices from the device log 116. Since home devices are not typically associated with any particular person, the thermostat 102 filters or removes the devices from the device log 116 that are classified as a home device. As an example, the thermostat 102 may filter or remove the entries 122 from the device log 116 that are associated with a home device classification. By filtering out the home devices, the thermostat 102 is able to isolate the remaining devices which are classified as user devices. This process allows the thermostat 102 to isolate the devices that may be uniquely associated with a person.

At step 424, the thermostat 102 clusters the user devices from the device log 116. In one embodiment, the thermostat 102 may cluster the user devices based on a confidence level that one or more devices are present at the same time within the space 500. The thermostat 102 computes a confidence level for each pair of user devices in the device log 116. As an example, the confidence level that a user device B is present when user device A is present can be determined using the following expression $$\frac{P(A, B)}{P(A)}$$

where P(A, B) equals the probability of user device A and user device B being present within a space and P(A) is the probability of user device A being present within the space. The thermostat 102 may repeat this process for pairs of entries 122 in the device log 116 over a predetermined period of time. For example, the thermostat 102 may compute confidence levels for pairs of user devices over a span of one or more days. A higher confidence level between a pair of user devices indicates that the pair of user devices are often present at the same time within the space 500. In this case, the pair of user devices likely belong to the same person. A low confidence level between a pair of user devices indicates that the pair of user devices are not often present at the same time within the space 500. In this case, the pair of user devices likely do not belong to the same person. Through this process, the thermostat 102 begins to cluster user devices that have a high confidence level among the user devices. For example, the thermostat 102 may compare the confidence levels between user devices to a predetermined threshold value to identify user devices that should be clustered together. In this example, the thermostat

102 may cluster user devices that have a confidence level that is greater than or equal to the predetermined threshold value. The thermostat 102 may use any suitable predetermined threshold value for clustering user devices. After clustering, e36ach cluster of user devices corresponds with a different person that is present within the space 500.

At step 426, the thermostat 102 identifies a primary device for each cluster. In one embodiment, the thermostat 102 identifies a smartphone from among the user devices within each cluster and classifies the smartphone as the primary device for the cluster. In other examples, the thermostat 102 may alternatively classify any other suitable type of user device as a primary device for a cluster. In one embodiment, the thermostat 102 may identify a smartphone based on a device identifier that is associated with a user device. In another embodiment, the thermostat 102 may identify a smartphone based on the confidence levels that are associated with a user device. For example, when a user device has confidence levels that equal to zero for some period of time this may indicate that the user device was present within the space 500 without any other user devices and therefore is a primary device (e.g. a smartphone) for a person.

By identifying a smartphone from among the user devices within a cluster, the thermostat 102 is able to associate additional information about a person with the user devices within a cluster. For example, the thermostat 102 may use the smartphone to determine a user identifier (e.g. a name) for the person associated with the user devices within a cluster. After determining the user identifier for the person that is associated with the user devices in the cluster, the thermostat 102 may store an association between the user identifier and the other user devices within the cluster. The thermostat 102 may also associate other information such as user preference settings, schedule information, and set point temperature preferences with the user devices in the cluster. For example, the thermostat 102 may determine set point temperature settings for a person that is associated with the user identifier over a predetermined time period. The thermostat 102 may then associate the determined temperature settings with the entries 122 in the device log 116 for the user devices that are associated with the person. In other examples, the thermostat 102 may associate any other suitable type of information with the user devices that are associated with a person.

At step 428, the thermostat 102 determines a predicted occupancy level based on the number of identified clusters. The thermostat 102 sets the predicted occupancy level to the number of identified clusters. Each cluster corresponds with a different person that is present within the space 500. Continuing with the example in FIG. 6, the thermostat 102 determines that two people are present within the space 500.

At step 430, the thermostat 102 controls the HVAC system 104 based on the predicted occupancy level. The thermostat 102 may control the HVAC system 104 using a process similar to the process described in step 226 of FIG. 2. For example, the thermostat 102 may adjust a set point temperature for the space 500 based on the predicted number of people within the space 500. As another example, the thermostat 102 may transition the HVAC system 104 into a low power mode or out of a low power mode based on the predicted number of people within the space 500. In other examples, the thermostat 102 may be configured to perform any other suitable type of operation to control the operation of the HVAC system 104 based on the predicted number of people within the space 500.

In some embodiments, the thermostat 102 may identify a person that is present within the space 500 based on the user devices that are currently detected within the space 500. The thermostat 102 may then use personalized information that is associated with the person to control the HVAC system 104. For example, the thermostat 102 may identify a user device that is currently present within the space 500. The thermostat 102 may then identify a user identifier that is associated with the user device in the device log 116. The thermostat 102 then identifies user preference settings (e.g. temperature settings) that are associated with the user identifier in the device log 116. The thermostat 102 may then use the user preference settings to control the operation of the HVAC system 104.

Occupancy Tracking Process Using Wireless Signal Distortion

FIG. 7 is a flowchart of an embodiment of an occupancy tracking process 700 using wireless signal distortion. The occupancy tracking system 100 may employ process 700 to determine the number of people that are present within a space based on a signal strength of a network connection between thermostat 102 and the access point 106. Unlike existing HVAC systems that rely on proximity sensors and motion sensors, the occupancy tracking system 100 is able to monitor the signal strength of the network connection over time to determine the number of people that are present within the space based on the measured signal strength. In a first phase, the occupancy tracking system 100 collects training data 138 that is used to train a machine learning model 120 to predict the number of people that are present within a space based on wireless signal distortion information. The training data 138 comprises signal strength measurements 144 over a period of time and statistical metadata 146 for the signal strength measurements 144. In a second phase, the occupancy tracking system 100 collects current wireless signal distortion information (e.g. current signal strength measurements 144) and provides the collected information to the trained machine learning model 120 to obtain a predicted occupancy level for the space. Process 700 allows the occupancy tracking system 100 to efficiently control the operation of the HVAC system 104 based on the determined number of people that are present within the space.

Machine Learning Model Training Phase

At step 702, the thermostat 102 establishes a network connection with an access point 106. As an example, the thermostat 102 may join a WiFi network that is associated with the access point 106. In other examples, the thermostat 102 may join a Zigbee network, a Z-wave network, an RF network, or any other suitable type of network that is associated with the access point 106. After establishing the network connection with the access point 106, the thermostat 102 is able to determine a signal strength of the network connection with the access point 106. Referring to FIG. 8 as an example, the thermostat 102 establishes a network connection 802 with an access point 106 that is located within a space 800 (e.g. a home).

At step 704, the thermostat 102 measures the signal strength of the network connection 802 between the thermostat 102 and the access point 106 over a predetermined time period. For example, the thermostat 102 may determine a Received Signal Strength Indicator (RSSI) value that indicates the signal strength of the network connection 802 over the predetermined time period. In other examples, the thermostat 102 may use any other suitable type of metric for determining the signal strength of the network connection 802.

At step 706, the thermostat 102 generates one or more training data entries 140 within the training data 138 for the measured signal strength. In one embodiment, each training data entry 140 comprises a timestamp 142 that indicates when the signal strength was recorded and a signal strength measurement 144. As an example, the predetermined time period may be ten minutes. In this example, the thermostat 102 may be configured to generate a training data entry 140 for each minute of the predetermined time period. This means that the thermostat 102 will create ten training data entries 140 that each comprise a timestamp 142 that identifies a time within the predetermined time period and the corresponding signal strength measurement 144. In other examples, the predetermined time period may be any other suitable amount of time. In addition, the thermostat 102 may also be configured to generate training data entries 140 for any other suitable time interval.

At step 708, the thermostat 102 determines whether to collect more training data 138. In one embodiment, the thermostat 102 may be configured to continue collecting training data 138 for a predetermined amount of time. The thermostat 102 may use a timer to determine whether the predetermined amount of time has elapsed. The thermostat 102 determines to continue collecting training data 138 when the timer has not expired. The thermostat 102 determines to discontinue collecting training data 138 when the timer has elapsed. The thermostat 102 returns to step 704 in response to determining to collect additional training data 138. In this case, the thermostat 102 will continue to collect training data 138 until the predetermined amount of time has elapsed.

As an example, the thermostat 102 may return to step 704 to collect additional training data 138. In the example shown in FIG. 9, two people (i.e. person 804 and person 806) are present in the space 800 while the thermostat 102 collects additional signal strength measurements 144. The signal strength of the network connection 802 between the thermostat 102 and the access point 106 will diminish as the number of people within the space 800 increases. The reason for this is because each person in the room creates a distortion that negatively impacts the signal strength of the network connection 802 between the thermostat 102 and the access point 106. For example, when a person passes between the thermostat 102 and the access point 106, the line of sight path for signal communications between thermostat 102 and the access point 106 becomes obscured and degrades the signal strength of the network connection 802. By learning the relationship between the number of people that are present within the space 800 and the corresponding measured signal strength, the machine learning model 120 is able to accurately predicted the number of people that are present within the space 800 based on a measured signal strength.

Returning to FIG. 7 at step 708, the thermostat 102 proceeds to step 710 in response to determining not to collect additional training data 138. At step 710, the thermostat 102 generates statistical metadata 146 for the training data entries 140. The statistical metadata 146 comprises statistics that are associated with the signal strength measurements 144 over the predetermined time period. For example, the statistical metadata 146 may comprise a mean value, a standard deviation value, a skew value, a variance value, a maximum signal strength value, a minimum signal strength value, or any other suitable type of statistical information associated with the wireless signal distortion information.

At step 712, the thermostat 102 associates occupancy information with the training data entries 140. Here, the thermostat 102 determines the number of people that were present within the space 800 while capturing the training information. The thermostat 102 associates the number of people that are within the space 800 with each of entries 140 in the training data 138. In one embodiment, the thermostat 102 may determine the number of people that are present within the space 800 using a process similar to process 200 and/or process 400 that are described in FIGS. 2 and 4, respectively. For example, the thermostat 102 may detect one or more devices that are connected to the access point 106 and then determine the number of people that are present within the space 800 based on the detected devices. As another example, the thermostat 102 may capture an audio signal within the space 800, identify voices within the audio signal, and determine the number of people that are present within the space 800 based on the identified voices. In another embodiment, the thermostat 102 may query a user to identify the number of people that are present within the space 800 for each of the entries 140 in the training data 138. In other embodiments, the thermostat 102 may use any other suitable technique for determining the number of people that were present within the space 800 for each of the entries 140 in the training data 138.

At step 714, the thermostat 102 trains a machine learning model 120 using the training data entries 140. The thermostat 102 may use any suitable technique for training the machine learning model 120 using the training data 138 as would be appreciated by one of ordinary skill in the art. After training the machine learning model 120, the machine learning model 120 is configured to output a predicted occupancy level for the space 800 based on a current signal strength measurement 144 and statistical metadata 146 for the current signal strength measurement 144. In some embodiments, the thermostat 102 may continue to collect training data 138 and to train the machine learning model 120 in parallel or in the background while proceeding to step 716.

Occupancy Tracking Phase

After training the machine learning model 120, the thermostat 102 may begin collecting current wireless signal distortion information (e.g. current signal strength measurements 144) to provide to the machine learning model 120 to determine the number of people that are present within the space 800. At step 716, the thermostat 102 measures a current signal strength 144 between the thermostat 102 and the access point 106. The thermostat 102 may measure the current signal strength 144 between the thermostat 102 and the access point 106 using a process similar to the process described in step 704.

At step 718, the thermostat 102 generates statistical metadata 146 for the current signal strength measurement 144. The thermostat 102 may generate statistical metadata 146 for the current signal strength measurement 144 using a process similar to the process described in step 710.

At step 720, the thermostat 102 inputs the current signal strength measurement 144 and the statistical metadata 146 into the machine learning model 120. The machine learning model 120 is configured to determine and output a predicted occupancy level for the space 800 based on the current signal strength measurement 144 and the corresponding statistical metadata 146. The predicted occupancy level indicates a number of people that the machine learning model 120 predicts are currently present within the space 800 based on the provided input. At step 722, the thermostat 102 obtains a predicted occupancy level from the machine learning model 120.

At step 724, the thermostat 102 controls the HVAC system 104 based on the predicted occupancy level. The thermostat 102 may control the HVAC system 104 using a process similar to the process described in step 226 of FIG. 2. For example, the thermostat 102 may adjust a set point temperature for the space 500 based on the predicted number of people within the space 500. As another example, the thermostat 102 may transition the HVAC system 104 into a low power mode or out of a low power mode based on the predicted number of people within the space 500. In other examples, the thermostat 102 may be configured to perform any other suitable type of operation to control the operation of the HVAC system 104 based on the predicted number of people within the space 500.

Occupancy Tracking Process Using Environmental Information

FIG. 10 is a flowchart of an embodiment of an occupancy tracking process 1000 using environmental information. The occupancy tracking system 100 may employ process 1000 to determine the number of people that are present within a space based on a combination of environmental information. In one embodiment, the occupancy tracking system 100 may determine the number of people that are present within a space based on the voices that are heard within the space, the user devices that are detected within the space, and/or the signal strength of a network connection between the thermostat 102 and the access point 106. In other embodiments, the occupancy tracking system 100 may determine the number of people that are present within the space based on any other suitable combination of environmental information about the space. Process 1000 allows the occupancy tracking system 100 to distinguish electronic devices (e.g. televisions and desktop computers) that are typically present in a space from personal user devices to provide a more accurate prediction of the number of people that are present within the space. Process 1000 also allows the occupancy tracking system 100 to filter out voices that come from electronic sound sources (e.g. televisions and radios) rather than people to provide a more accurate prediction of the number of people that are present within the space. Process 1000 also allows the occupancy tracking system 100 to efficiently control the operation of the HVAC system 104 based on the determined number of people that are present within the space.

At step 1002, the thermostat 102 determines a first occupancy level using a voice-based occupancy detection process. In one embodiment, the thermostat 102 may determine the first occupancy level using a process similar to process 200 that is described in FIG. 2. As an example, the thermostat 102 may record sound samples over a period of time. The sound samples may comprise one or more audio signals 306 that include the voice of a person. The thermostat 102 computes an audio signature 134 for each audio signals 306 and determines a direction of arrival 136 for each audio signal 306. The thermostat 102 then populates entries 130 in the voice data log 118 for the audio signal 306. The thermostat 102 then identifies one or more clusters for the entries 130 based on the voices identified in the audio signal 306 and a direction of arrival 136 that is associated with each voice. The thermostat 102 then determines the number of clusters that were identified where each cluster corresponds with a person that is present within the space.

At step 1004, the thermostat 102 determines a second occupancy level using a device-based occupancy detection process. In one embodiment, the thermostat 102 may determine the second occupancy level using a process similar to process 400 that is described in FIG. 4. As an example, the thermostat 102 may identify one or more devices that are currently connected to the access point 106 over a predetermined time period. The thermostat 102 then populates entries 122 in the device log 116 for the identified devices. The thermostat 102 will then identify one or more clusters for the entries 122 of the device log 116 where each cluster identifies devices that are present within the space at the same time. The thermostat 102 may then determine the number of clusters that are identified where each cluster corresponds with a person that is present within the space.

At step 1006, the thermostat 102 determines a third occupancy level using a wireless signal distortion-based occupancy detection process. In one embodiment, the thermostat 102 may determine the third occupancy level using a process similar to process 700 that is described in FIG. 7. As an example, the thermostat 102 may capture wireless signal distortion information for the network connection between the thermostat 102 and the access point 106. The wireless signal distortion information comprises signal strength measurements 144 of the network connection between the thermostat 102 and the access point 106 over a predetermined time period. The thermostat 102 then generates statistical metadata 146 for the wireless signal distortion information. The thermostat 102 inputs the wireless signal distortion information and the statistical metadata 146 for the wireless signal distortion information into a machine learning model 120 to obtain the third occupancy level from the machine learning model 120.

At step 1008, the thermostat 102 determines a predicted occupancy level based on the first occupancy level, the second occupancy level, and the third occupancy level. The predicted occupancy level indicates a predicted number of people that are present within the space based on the first occupancy level, the second occupancy level, and the third occupancy level. In one embodiment, the thermostat 102 may determine the predicted occupancy level by taking an average of the first occupancy level, the second occupancy level, and the third occupancy level.

In other embodiments, the thermostat 102 may determine the predicted occupancy level based on a consensus or a voting scheme between the first occupancy level, the second occupancy level, and the third occupancy level. As an example, the first occupancy level may indicate that two people are present within the space, the second occupancy level may indicate that three people are present within the space, and the third occupancy level may indicate that two people are present within the space. In this example, the thermostat 102 may determine that the predicted occupancy level is two people based on the first occupancy level, the second occupancy level, and the third occupancy level. In other embodiments, the thermostat 102 may use any other suitable technique for determining the predicted occupancy level based on the first occupancy level, the second occupancy level, and the third occupancy level.

At step 1010, the thermostat 102 determines whether the predicted occupancy level is greater than zero. The thermostat 102 proceeds to step 1016 in response to determining that the predicted occupancy level is not greater than zero. In this case, the thermostat 102 determines that no one is present within the space and transitions the HVAC system 104 to a low power mode (e.g. an away mode) to conserve energy. Otherwise, the thermostat 102 proceeds to step 1012 in response to determining that the predicted occupancy level is greater than zero. In this case, the thermostat 102 determines that at least one person is present within the space and adjusts the HVAC settings for the HVAC system 104 based on the people that are present.

At step 1012, the thermostat 102 identifies one or more people that are present within the space. In one embodiment, the thermostat 102 may identify a person that is present within the space based on the user devices that are currently present within the space. For example, the thermostat 102 may use a process similar to the process described in step 426 in FIG. 4 to identify user devices that are associated with a particular person.

At step 1014, the thermostat 102 identifies HVAC settings that are associated with the people that are present within the space. After the thermostat 102 identifies the people that are present within the space, the thermostat 102 may then use HVAC settings that are associated with the people to control the HVAC system 104. For example, the thermostat 102 may identify a user device that is currently present within the space 500. The thermostat 102 may then identify a user identifier that is associated with the user device in the device log 116. The thermostat 102 then identifies user preference settings (e.g. temperature settings) that are associated with the user identifier in the device log 116. The thermostat 102 may then use the user preference settings to control the operation of the HVAC system 104.

At step 1016, the thermostat 102 controls the HVAC system 104 based on the identified HVAC settings. The thermostat 102 may control the HVAC system 104 using a process similar to the process described in step 226 of FIG. 2. For example, the thermostat 102 may adjust a set point temperature for the space 500 based on the predicted number of people within the space and/or the HVAC settings for the people that present within the space. As another example, the thermostat 102 may transition the HVAC system 104 into a low power mode or out of a low power mode based on the predicted number of people within the space. In other examples, the thermostat 102 may be configured to perform any other suitable type of operation to control the operation of the HVAC system 104 based on the predicted number of people within the space and/or the HVAC settings for the people that present within the space.

Hardware Configuration for an Occupancy Tracking Device

Figure 11:
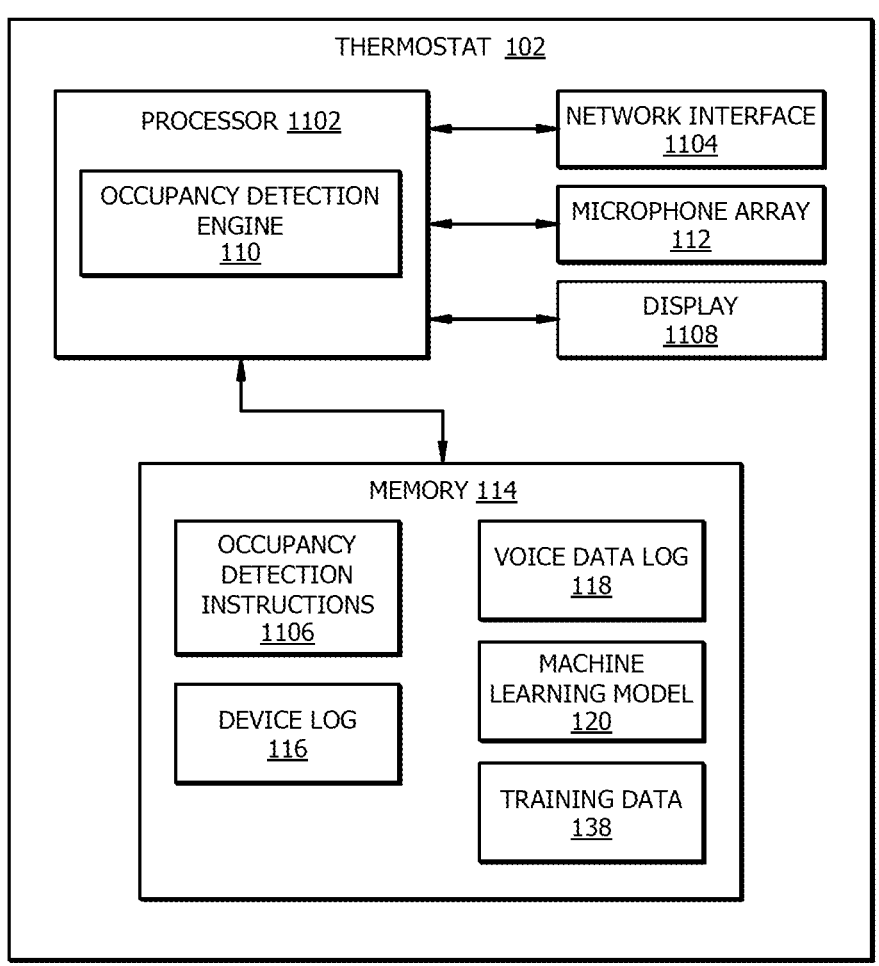
FIG. 11 is an embodiment of an occupancy tracking device for the occupancy tracking system.

FIG. 11 is an embodiment of a device (e.g. thermostat 102) of an occupancy tracking system 100. As an example, the thermostat 102 comprises a processor 1102, a memory 114, a network interface 1104, a microphone array 112, and a display 1108. The thermostat 102 may be configured as shown or in any other suitable configuration.

Processor

The processor 1102 comprises one or more processors operably coupled to the memory 114. The processor 1102 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 1102 may be a programmable logic device, a microcontroller, a microprocessor, or any suitable combination of the preceding. The processor 1102 is communicatively coupled to and in signal communication with the memory 114, the network interface 1104, the microphone array 112, and the display 1108. The one or more processors are configured to process data and may be implemented in hardware or software. For example, the processor 1102 may be 8-bit, 16-bit, 32-bit, 64-bit, or of any other suitable architecture. The processor 1102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute occupancy detection instructions 1106 to implement the occupancy detection engine 110. In this way, processor 1102 may be a special-purpose computer designed to implement the functions disclosed herein. In an embodiment, the occupancy detection engine 110 is implemented using logic units, FPGAs, ASICs, DSPs, or any other suitable hardware. The occupancy detection engine 110 is configured to operate as described in FIGS. 1-10. For example, the occupancy detection engine 110 may be configured to perform the steps of process 200, 400, 700, and 1000 as described in FIGS. 2, 4, 7, and 10, respectively.

Memory

The memory 114 is operable to store any of the information described above with respect to FIGS. 1-10 along with any other data, instructions, logic, rules, or code operable to implement the function(s) described herein when executed by the processor 1102. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store occupancy detection instructions 1106, device logs 116, voice data logs 118, machine learning models 120, training data 138, and/or any other data or instructions. The occupancy detection instructions 1106 may comprise any suitable set of instructions, logic, rules, or code operable to execute the occupancy detection engine 110. The device logs 116, the voice data logs 118, the training data 138, and the machine learning models 120 are configured similar to the device logs 116, the voice data logs 118, the training data 138, and the machine learning models 120 described in FIGS. 1-10.

Network Interface

The network interface 1104 is configured to enable wired and/or wireless communications. The network interface 1104 is configured to communicate data between the thermostat 102 and other devices (e.g. the HVAC system 104 and the access point 106), systems, or domains. For example, the network interface 1104 may comprise an NFC interface, a Bluetooth interface, a Zigbee interface, a Z-wave interface, an RFID interface, a WIFI interface, a LAN interface, a WAN interface, a PAN interface, a modem, a switch, or a router. The processor 1102 is configured to send and receive data using the network interface 1104. The network interface 1104 may be configured to use any suitable type of communication protocol as would be appreciated by one of ordinary skill in the art.

Microphone Array

The microphone array 112 comprises a plurality of microphones. Each microphone is configured to capture audio signals (e.g. voices) of users. The microphone array 112 may be configured to capture audio signals continuously, at predetermined intervals, or on-demand. The microphone array 112 is operably coupled to the occupancy detection engine 110 and provides captured audio signals to the occupancy detection engine 110 to send to the processor 1102 for processing.

Display

The display 1108 is configured to present visual information to user using graphical objects. Examples of the display 1108 include, but are not limited to, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art.

HVAC System Configuration

Figure 12:
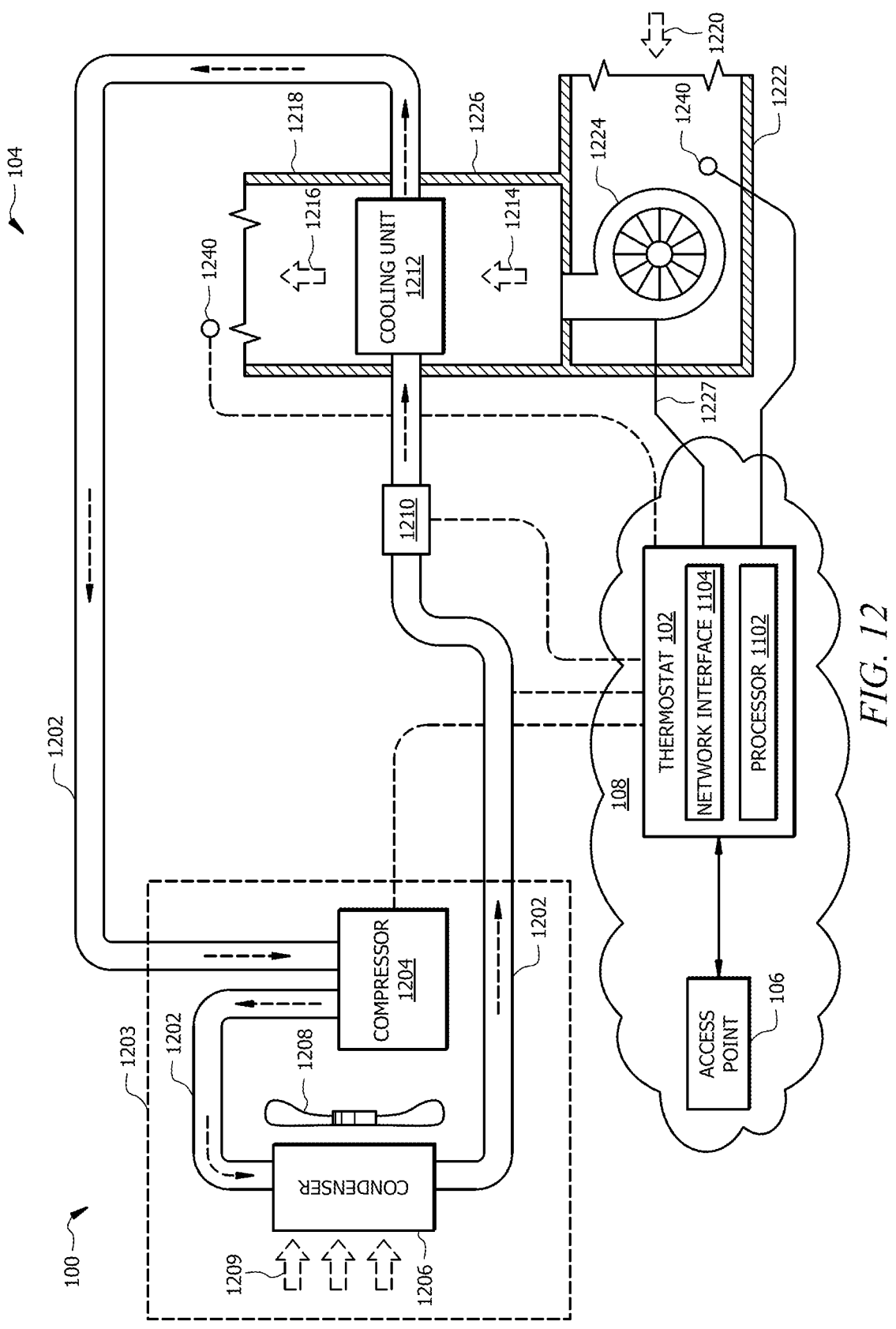
FIG. 12 is a schematic diagram of an embodiment of an HVAC system configured to integrate with the occupancy tracking system.

FIG. 12 is a schematic diagram of an embodiment of an HVAC system 104 configured to integrate with an occupancy tracking system 100. The HVAC system 104 conditions air for delivery to an interior space of a building or home. In some embodiments, the HVAC system 104 is a rooftop unit (RTU) that is positioned on the roof of a building and the conditioned air is delivered to the interior of the building. In other embodiments, portions of the system may be located within the building and a portion outside the building. The HVAC system 104 may also include heating elements that are not shown here for convenience and clarity. The HVAC system 104 may be configured as shown in FIG. 12 or in any other suitable configuration. For example, the HVAC system 104 may include additional components or may omit one or more components shown in FIG. 12.

The HVAC system 104 comprises a working-fluid conduit subsystem 1202 for moving a working fluid, or refrigerant, through a cooling cycle. The working fluid may be any acceptable working fluid, or refrigerant, including, but not limited to, fluorocarbons (e.g. chlorofluorocarbons), ammonia, non-halogenated hydrocarbons (e.g. propane), hydrofluorocarbons (e.g. R-410A), or any other suitable type of refrigerant.

The HVAC system 104 comprises one or more condensing units 1203. In one embodiment, the condensing unit 1203 comprises a compressor 1204, a condenser coil 1206, and a fan 1208. The compressor 1204 is coupled to the working-fluid conduit subsystem 1202 that compresses the working fluid. The condensing unit 1203 may be configured with a single-stage or multi-stage compressor 1204. A single-stage compressor 1204 is configured to operate at a constant speed to increase the pressure of the working fluid to keep the working fluid moving along the working-fluid conduit subsystem 1202. A multi-stage compressor 1204 comprises multiple compressors configured to operate at a constant speed to increase the pressure of the working fluid to keep the working fluid moving along the working-fluid conduit subsystem 1202. In this configuration, one or more compressors can be turned on or off to adjust the cooling capacity of the HVAC system 104. In some embodiments, a compressor 1204 may be configured to operate at multiple speeds or as a variable speed compressor. For example, the compressor 1204 may be configured to operate at multiple predetermined speeds.

In one embodiment, the condensing unit 1203 (e.g. the compressor 1204) is in signal communication with a controller or thermostat 102 using a wired or wireless connection. The thermostat 102 is configured to provide commands or signals to control the operation of the compressor 1204. For example, the thermostat 102 is configured to send signals to turn on or off one or more compressors 1204 when the condensing unit 1203 comprises a multi-stage compressor 1204. In this configuration, the thermostat 102 may operate the multi-stage compressors 1204 in a first mode where all the compressors 1204 are on and a second mode where at least one of the compressors 1204 is off. In some examples, the thermostat 102 may be configured to control the speed of the compressor 1204.

The condenser 1206 is configured to assist with moving the working fluid through the working-fluid conduit subsystem 1202. The condenser 1206 is located downstream of the compressor 1204 for rejecting heat. The fan 1208 is configured to move air 1209 across the condenser 1206. For example, the fan 1208 may be configured to blow outside air through the heat exchanger to help cool the working fluid. The compressed, cooled working fluid flows downstream from the condenser 1206 to an expansion device 1210, or metering device.

The expansion device 1210 is configured to remove pressure from the working fluid. The expansion device 1210 is coupled to the working-fluid conduit subsystem 1202 downstream of the condenser 1206. The expansion device 1210 is closely associated with a cooling unit 1212 (e.g. an evaporator coil). The expansion device 1210 is coupled to the working-fluid conduit subsystem 1202 downstream of the condenser 1206 for removing pressure from the working fluid. In this way, the working fluid is delivered to the cooling unit 1212 and receives heat from airflow 1214 to produce a treated airflow 1216 that is delivered by a duct subsystem 1218 to the desired space, for example, a room in the building.

A portion of the HVAC system 104 is configured to move air across the cooling unit 1212 and out of the duct subsystem 1218. Return air 1220, which may be air returning from the building, fresh air from outside, or some combination, is pulled into a return duct 1222. A suction side of a variable-speed blower 1224 pulls the return air 1220. The variable-speed blower 1224 discharges airflow 1214 into a duct 1226 from where the airflow 1214 crosses the cooling unit 1212 or heating elements (not shown) to produce the treated airflow 1216.

Examples of a variable-speed blower 1224 include, but are not limited to, belt-drive blowers controlled by inverters, direct-drive blowers with electronically commutated motors (ECM), or any other suitable types of blowers. In some configurations, the variable-speed blower 1224 is configured to operate at multiple predetermined fan speeds. In other configurations, the fan speed of the variable-speed blower 1224 can vary dynamically based on a corresponding temperature value instead of relying on using predetermined fan speeds. In other words, the variable-speed blower 1224 may be configured to dynamically adjust its fan speed over a range of fan speeds rather than using a set of predetermined fan speeds. This feature also allows the thermostat 102 to gradually transition the speed of the variable-speed blower 1224 between different operating speeds. This contrasts with conventional configurations where a variable-speed blower 1224 is abruptly switched between different predetermined fan speeds. The variable-speed blower 1224 is in signal communication with the thermostat 102 using any suitable type of wired or wireless connection 1227. The thermostat 102 is configured to provide commands or signals to the variable-speed blower 1224 to control the operation of the variable-speed blower 1224. For example, the thermostat 102 is configured to send signals to the variable-speed blower 1224 to control the fan speed of the variable-speed blower 1224. In some embodiments, the thermostat 102 may be configured to send other commands or signals to the variable-speed blower 1224 to control any other functionality of the variable-speed blower 1224.

The HVAC system 104 comprises one or more sensors 1240 in signal communication with the thermostat 102. The sensors 1240 may comprise any suitable type of sensor for measuring the air temperature. The sensors 1240 may be positioned anywhere within a conditioned space (e.g. a room or building) and/or the HVAC system 104. For example, the HVAC system 104 may comprise a sensor 1240 positioned and configured to measure an outdoor air temperature. As another example, the HVAC system 104 may comprise a sensor 1240 positioned and configured to measure a supply or treated air temperature and/or a return air temperature. In other examples, the HVAC system 104 may comprise sensors 1240 positioned and configured to measure any other suitable type of air temperature.

The HVAC system 104 comprises one or more thermostats, for example, located within a conditioned space (e.g. a room or building). A thermostat may be a single-stage thermostat, a multi-stage thermostat, or any suitable type of thermostat as would be appreciated by one of ordinary skill in the art. The thermostat is configured to allow a user to input a desired temperature or temperature set point for a designated space or zone such as the room. The thermostat 102 may use information from the thermostat such as the temperature set point for controlling the compressor 1204 and the variable-speed blower 1224. The thermostat is in signal communication with the thermostat 102 using any suitable type of wired or wireless communications. In some embodiments, the thermostat may be integrated with the thermostat 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An occupancy tracking device, comprising:
   a network interface operably coupled to a Heating, Ventilation, and Air Conditioning (HVAC) system, wherein the HVAC system is configured to control a temperature of a space;
   a memory operable to store a device log that comprises a plurality of entries, wherein each entry of the device log corresponds to a device; and
   a processor operably coupled to the network interface and the memory, configured to:
   establish a network connection with an access point;
   identify a plurality of devices that are connected to the access point over a predetermined time period;

populate entries in the device log for the plurality of devices;

associate a user device classification for a subset of the plurality of devices based at least in part upon an amount of time that the subset of the plurality of devices are present in the space during the predetermined time period;

identify one or more clusters for the subset of the plurality of devices that are associated with a user device classification, wherein a cluster identifies one or more devices that are present within the space at the same time;

determine a number of clusters that are identified;

determine a predicted occupancy level based on the number of clusters that are identified; and control the HVAC system based on the predicted occupancy level, wherein identifying a cluster comprises:

selecting a device from an entry in the device log;

determining confidence levels between the selected device and other devices in the device log, wherein each confidence level indicates a probability that another device is present within the space when the selected device is present within the space;

identifying one or more devices that are associated with a confidence level that is greater than a predetermined threshold value; and defining the cluster that comprises the selected device and the one or more devices that are associated with a confidence level that is greater than the predetermined threshold value.

2. The device of claim 1, wherein the processor is further configured to:

identify a person that is associated with a device within a cluster; and associate an identifier for the person with the devices within the cluster in the device log.

3. The device of claim 1, wherein the processor is further configured to:

identify a device within each of the one or more clusters that corresponds with a smartphone; and classify the identified devices as a primary device for a corresponding cluster.

4. The device of claim 1, wherein the processor is further configured to:

determine temperature settings during the predetermined time period; and associate the temperature settings with the one or more entries that are associated with a user device classification.

5. The device of claim 1, wherein controlling the HVAC system comprises:

determining a number of people that are present within the space is zero; and transitioning the HVAC system to a low power mode.

6. The device of claim 1, wherein controlling the HVAC system comprises adjusting a set point temperature for the space.

7. An occupancy tracking method, comprising:

establishing a network connection with an access point;

identifying a plurality of devices that are connected to the access point over a predetermined time period;

populating entries in a device log for the plurality of devices, wherein each entry of the device log corresponds to a device;

associating a user device classification for a subset of the plurality of devices based at least in part upon an amount of time that the subset of the plurality of devices are present in the space during the predetermined time period;

identifying one or more clusters for the subset of the plurality of devices that are associated with a user device classification, wherein a cluster identifies one or more devices that are present within a space at the same time;

determining a number of clusters that are identified;

determining a predicted occupancy level based on the number of clusters that are identified; and controlling a Heating, Ventilation, and Air Conditioning (HVAC) system based on the predicted occupancy level, wherein the HVAC system is configured to control a temperature of the space, wherein identifying a cluster comprises:

selecting a device from an entry in the device log;

determining confidence levels between the selected device and other devices in the device log, wherein each confidence level indicates a probability that another device is present within the space when the selected device is present within the space;

identifying one or more devices that are associated with a confidence level that is greater than a predetermined threshold value; and defining the cluster that comprises the selected device and the one or more devices that are associated with a confidence level that is greater than the predetermined threshold value.

8. The method of claim 7, further comprising:

identifying a person that is associated with a device within a cluster; and associating an identifier for the person with the devices within the cluster in the device log.

9. The method of claim 7, further comprising:

identifying a device within each of the one or more clusters that corresponds with a smartphone; and classifying the identified devices as a primary device for a corresponding cluster.

10. The method of claim 7, further comprising:

determining temperature settings during the predetermined time period; and associating the temperature settings with the one or more entries that are associated with a user device classification.

11. The method of claim 7, wherein controlling the HVAC system comprises:

determining a number of people that are present within the space is zero; and transitioning the HVAC system to a low power mode.

12. The method of claim 7, wherein controlling the HVAC system comprises adjusting a set point temperature for the space.

13. An occupancy tracking system, comprising:

a Heating, Ventilation, and Air Conditioning (HVAC) system, wherein the HVAC system is configured to control a temperature of a space;

an access point configured to transmit data to a thermostat; and the thermostat in signal communication with the HVAC system and the access point, configured to:

establish a network connection with the access point;

identify a plurality of devices that are connected to the access point over a predetermined time period;

populate entries in a device log for the plurality of devices, wherein each entry of the device log corresponds to a device;

associate a user device classification for a subset of the plurality of devices based at least in part upon an amount of time that the subset of the plurality of devices are present in the space during the predetermined time period;

identify one or more clusters for the subset of the plurality of devices that are associated with a user device classification, wherein a cluster identifies one or more devices that are present within the space at the same time;

determine a number of clusters that are identified;

determine a predicted occupancy level based on the number of clusters that are identified; and control the HVAC system based on the predicted occupancy level, wherein identifying a cluster comprises:

selecting a device from an entry in the device log;

determining confidence levels between the selected device and other devices in the device log, wherein each confidence level indicates a probability that another device is present within the space when the selected device is present within the space;

identifying one or more devices that are associated with a confidence level that is greater than a predetermined threshold value; and defining the cluster that comprises the selected device and the one or more devices that are associated with a confidence level that is greater than the predetermined threshold value.

14. The system of claim 13, wherein the thermostat is further configured to:

identify a person that is associated with a device within a cluster; and associate an identifier for the person with the devices within the cluster in the device log.

15. The system of claim 13, wherein the thermostat is further configured to:

identify a device within each of the one or more clusters that corresponds with a smartphone; and classify the identified devices as a primary device for a corresponding cluster.

16. The system of claim 13, wherein the thermostat is further configured to:

determine temperature settings during the predetermined time period; and associate the temperature settings with the one or more entries that are associated with a user device classification.

17. The system of claim 13, wherein controlling the HVAC system comprises adjusting a set point temperature for the space.

* * * * *